US010636294B1

(12) United States Patent
Gentile et al.

(10) Patent No.: US 10,636,294 B1
(45) Date of Patent: Apr. 28, 2020

(54) COMPUTER SYSTEM AND METHOD FOR STATE PREDICTION OF A TRAFFIC SYSTEM

(71) Applicant: SISTEMA—SOLUZIONI PER L'INGEGNERIA DEI SISTEMI DI TRASPORTO E L'INFOMOBILITÀ S.R.L., Rome (IT)

(72) Inventors: Guido Gentile, Rome (IT); Lorenzo Meschini, Rome (IT); Alessandro Attanasi, Rome (IT)

(73) Assignee: PTV Planung Transport Verkehr AG, Karlsruhe (DE)

(*) Notice: Subject to any disclaimer, the term of this patent is extended or adjusted under 35 U.S.C. 154(b) by 0 days.

(21) Appl. No.: 16/707,178

(22) Filed: Dec. 9, 2019

Related U.S. Application Data

(63) Continuation of application No. PCT/EP2018/064010, filed on May 29, 2018.

(30) Foreign Application Priority Data

Jun. 9, 2017 (EP) .................................... 17175171

(51) Int. Cl.
*H04B 3/36* (2006.01)
*G08G 1/01* (2006.01)

(52) U.S. Cl.
CPC ......... *G08G 1/0129* (2013.01); *G08G 1/0112* (2013.01); *G08G 1/0145* (2013.01)

(58) Field of Classification Search
CPC ... G08G 1/0129; G08G 1/0112; G08G 1/0145
See application file for complete search history.

(56) References Cited

U.S. PATENT DOCUMENTS 5,822,712 A * 10/1998 Olsson ................. G08G 1/0104 701/117
6,505,114 B2 * 1/2003 Luciani ................ G08G 1/0104 701/117

(Continued)

FOREIGN PATENT DOCUMENTS

EP 2884230 A1 6/2015

OTHER PUBLICATIONS

International Search Report and Written Opinion for Application No. PCT/EP2018/064010, dated Sep. 20, 2019, 13 pages.

(Continued)

*Primary Examiner* — Phung Nguyen
(74) *Attorney, Agent, or Firm* — Brake Hughes Bellermann LLP

(57) ABSTRACT

Computer system, method and computer program product are provided for supporting an operator to control a traffic system including a traffic infrastructure configured to allow the movement of real world traffic participants. A state prediction module of the computer system determines, based on time-stamped location data of trajectories, time dependent speed profiles, time dependent turn probabilities, and time dependent attraction shares corresponding to time dependent turn probabilities. It further determines a state forecast (FC1) for a given future time point based on the time dependent traffic parameters including the speed profiles, turn probabilities, and attraction shares), in conjunction with at least one existing time-dependent origin-destination-matrix and a suitable Sequential Dynamic Traffic assignment methodology.

20 Claims, 13 Drawing Sheets

(56) References Cited

U.S. PATENT DOCUMENTS

| | | | | |
|---|---|---|---|---|
| 7,756,043 | B1 * | 7/2010 | Nucci | H04L 41/142 370/238 |
| 2012/0109506 | A1 * | 5/2012 | Fei | G08G 1/0116 701/118 |
| 2014/0114556 | A1 | 4/2014 | Pan et al. | |
| 2015/0300835 | A1 * | 10/2015 | Fowe | G01C 21/20 701/410 |
| 2016/0321923 | A1 * | 11/2016 | Seo | G08G 1/096775 |
| 2017/0262790 | A1 * | 9/2017 | Khasis | G01C 21/3415 |

OTHER PUBLICATIONS

Bellei, G. et al.: "A within-day dynamic traffic assignment model for urban road networks", Transportation Research Part B 39, 1-29, (2005), 40 pages.

Gentile, G. et al.: "Spillback congestion in dynamic traffic assignment: a macroscopic flow model with time-varying bottlenecks", Transportation Research Part B 41, 1114-1138, (2007), 53 pages.

Gentile, G.: "The General Link Transmission Model for dynamic network loading and a comparison with the DUE algorithm", Proceedings of the Second International Symposium on Dynamic Traffic Assignment—DTA 2008, Leuven, Belgium, (2008), 22 pages.

Meschini L. et al.: "Real-time traffic monitoring and forecast through OPTIMA—Optimal Path Travel Information for Mobility Actions", in Proceedings of Models and Technologies for Intelligent Transportation Systems, International Conference Rome 2009, ed.s G. Fusco, Aracne, 113-121, ISBN 978-88-548-3025-7—(MTITS2009), (2010), 9 pages.

Lou, Y. et al.: "Map-matching for low-sampling-rate GPS trajectories", In Proc. GIS. ACM, (2009), 11 pages.

* cited by examiner

610

```
procedure ZoneIndexing(traj)
    //take the first node of the first street of the trajectory
    origin ← traj.streets.first.tail
    zoneFound ← False
    // find, if exists, the zone corresponding to the origin
    traj.originZone, zoneFound ← findZone(origin)
    // find the first zone intersecting the trajectory
    if NOT zoneFound then
        for s in traj.streets do
            origin ← s.head
            traj.originZone, zoneFound ← findZone(origin)
            if zoneFound then
                Exit for
            end if
        end for
    end if
    zoneFound ← False
    // take the lasr node of the last street of the trajectory
    destination = traj.streets.last.head
    // here we find, if exists, the zone corresponding to the destination
    traj.destinationZone, zoneFound ← findZone(destination)
    if NOT zoneFound then
        for s in traj.streets.reverse do
            destination ← s.tail
            traj.destinationZone, zoneFound ← findZone(destination)
            if zoneFound then
                Exit for
            end if
        end for
    end if
end procedure
```

FIG. 6A

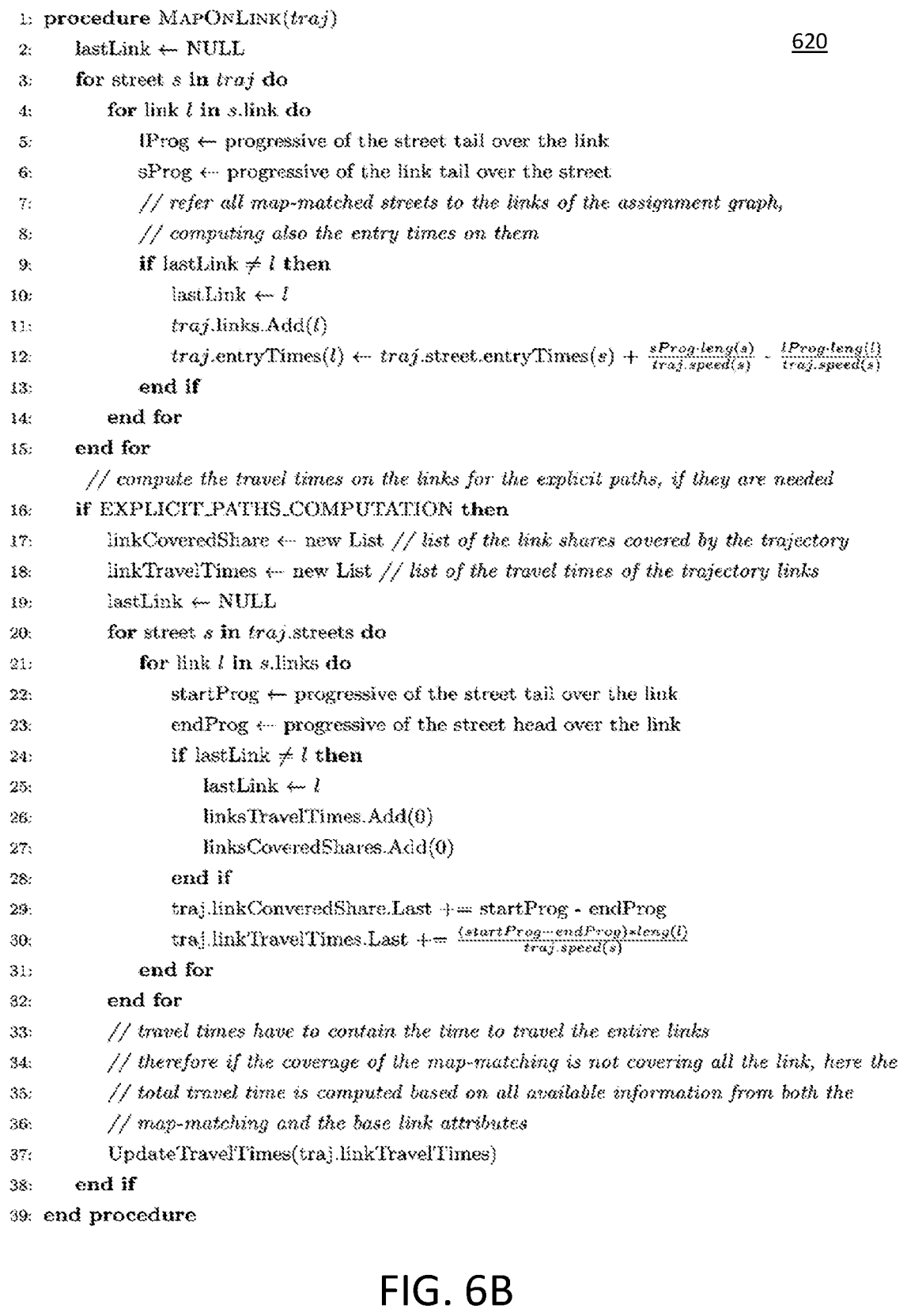

620

```
procedure MapOnLink(traj)
    lastLink ← NULL
    for street s in traj do
        for link l in s.link do
            lProg ← progressive of the street tail over the link
            sProg ← progressive of the link tail over the street
            // refer all map-matched streets to the links of the assignment graph,
            // computing also the entry times on them
            if lastLink ≠ l then
                lastLink ← l
                traj.links.Add(l)
                traj.entryTimes(l) ← traj.street.entryTimes(s) + (sProg·leng(s))/(traj.speed(s)) - (lProg·leng(l))/(traj.speed(s))
            end if
        end for
    end for
    // compute the travel times on the links for the explicit paths, if they are needed
    if EXPLICIT_PATHS_COMPUTATION then
        linkCoveredShare ← new List // list of the link shares covered by the trajectory
        linkTravelTimes ← new List // list of the travel times of the trajectory links
        lastLink ← NULL
        for street s in traj.streets do
            for link l in s.links do
                startProg ← progressive of the street tail over the link
                endProg ← progressive of the street head over the link
                if lastLink ≠ l then
                    lastLink ← l
                    linksTravelTimes.Add(0)
                    linksCoveredShares.Add(0)
                end if
                traj.linkConveredShare.Last += startProg - endProg
                traj.linkTravelTimes.Last += ((startProg - endProg)*leng(l))/(traj.speed(s))
            end for
        end for
        // travel times have to contain the time to travel the entire links
        // therefore if the coverage of the map-matching is not covering all the link, here the
        // total travel time is computed based on all available information from both the
        // map-matching and the base link attributes
        UpdateTravelTimes(traj.linkTravelTimes)
    end if
end procedure
```

FIG. 6B

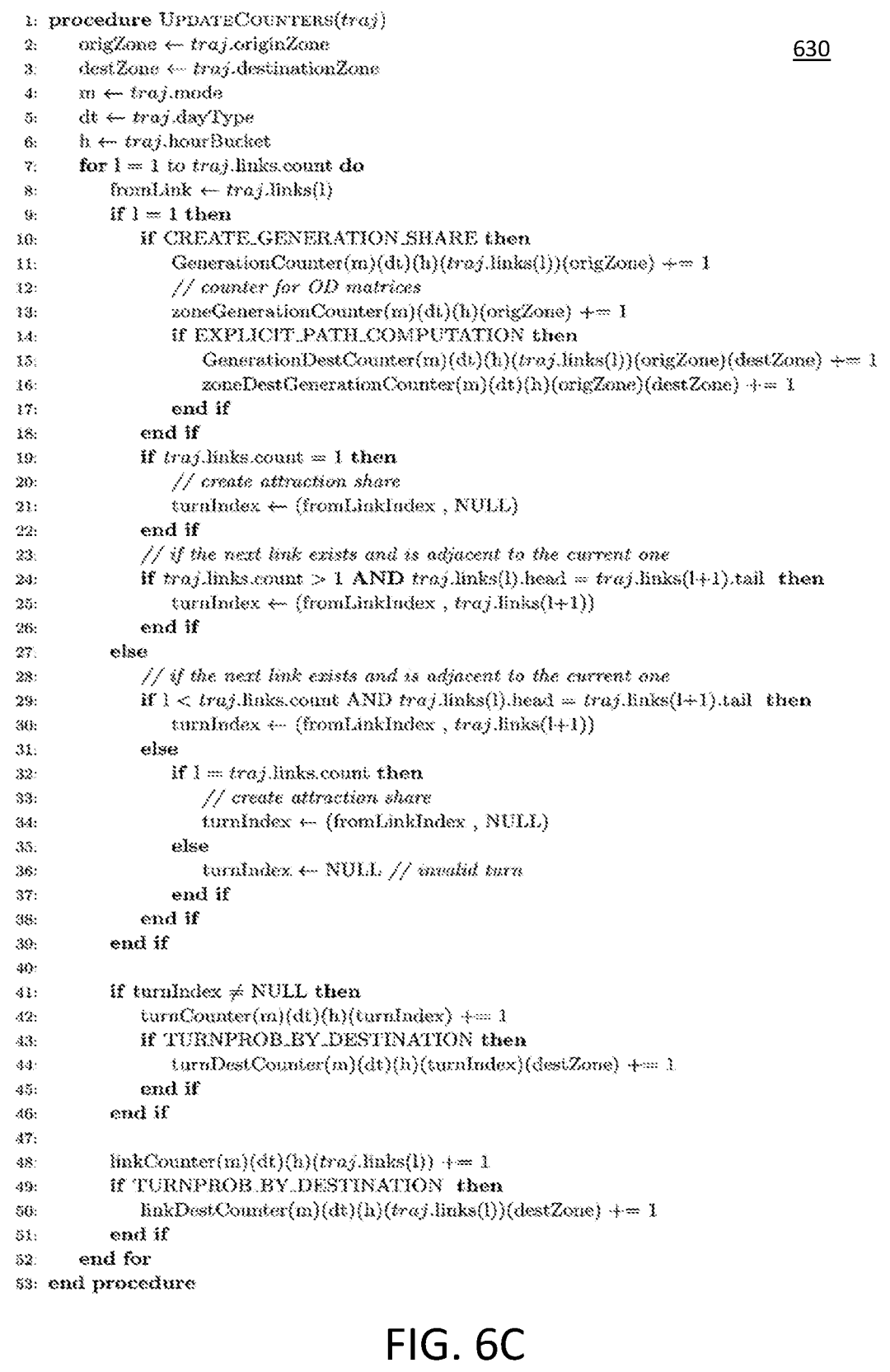

630

```
procedure UPDATECOUNTERS(traj)
    origZone ← traj.originZone
    destZone ← traj.destinationZone
    m ← traj.mode
    dt ← traj.dayType
    h ← traj.hourBucket
    for l = 1 to traj.links.count do
        fromLink ← traj.links(l)
        if l = 1 then
            if CREATE_GENERATION_SHARE then
                GenerationCounter(m)(dt)(h)(traj.links(l))(origZone) += 1
                // counter for OD matrices
                zoneGenerationCounter(m)(dt)(h)(origZone) += 1
                if EXPLICIT_PATH_COMPUTATION then
                    GenerationDestCounter(m)(dt)(h)(traj.links(l))(origZone)(destZone) += 1
                    zoneDestGenerationCounter(m)(dt)(h)(origZone)(destZone) += 1
                end if
            end if
            if traj.links.count = 1 then
                // create attraction share
                turnIndex ← (fromLinkIndex , NULL)
            end if
            // if the next link exists and is adjacent to the current one
            if traj.links.count > 1 AND traj.links(l).head = traj.links(l+1).tail then
                turnIndex ← (fromLinkIndex , traj.links(l+1))
            end if
        else
            // if the next link exists and is adjacent to the current one
            if l < traj.links.count AND traj.links(l).head = traj.links(l+1).tail then
                turnIndex ← (fromLinkIndex , traj.links(l+1))
            else
                if l = traj.links.count then
                    // create attraction share
                    turnIndex ← (fromLinkIndex , NULL)
                else
                    turnIndex ← NULL // invalid turn
                end if
            end if
        end if

        if turnIndex ≠ NULL then
            turnCounter(m)(dt)(h)(turnIndex) += 1
            if TURNPROB_BY_DESTINATION then
                turnDestCounter(m)(dt)(h)(turnIndex)(destZone) += 1
            end if
        end if

        linkCounter(m)(dt)(h)(traj.links(l)) += 1
        if TURNPROB_BY_DESTINATION then
            linkDestCounter(m)(dt)(h)(traj.links(l))(destZone) += 1
        end if
    end for
end procedure
```

FIG. 6C

640

```
procedure COMPUTETURNPROBABILITIES()
    for m in modes do
        for dt in in daytypes do
            for h in in hourBuckets do
                for t in turnCounter(m)(dt)(h) do
                    l1 ← t.firstLink
                    l2 ← t.secondLink
                    // number of trajectories passing through the turn t divided
                    // by the number of trajectories passing through the first link of the turn t
                    turnProb(m)(dt)(h)(l1, l2) ← turnCounter(m)(dt)(h)(l1,l2) / linkCounter(m)(dt)(h)(l1)
                end for
                if TURNPROB_BY_DESTINATION then
                    for t in in turnDestCounter(m)(dt)(h) do
                        l1 ← t.firstLink
                        l2 ← t.secondLink
                        for d in zones do
                            // number of trajectories passing through the turn t and going to
                            // the destination d, divided by the number of trajectories passing
                            // through the first link of the turn t and going to the destination d
                            turnDestProb(m)(dt)(h)(l1, l2)(d) ← turnDestCounter(m)(dt)(h)(l1,l2)(d) / linkDestCounter(m)(dt)(h)(l1)(d)
                        end for
                    end for
                end if
            end for
        end for
    end for
end procedure
```

FIG. 6D

650

```
procedure COMPUTEGENERATIONSHARES
  for mode m in modes do
    for day type dt in in daytypes do
      for hour bucket h in in hour buckets do
        for each link l, zone z in GenerationCounter(m)(dt)(h) do
          // they are the number of the trajectory generated in the link l from
          // the zone z divided by the number of trajectories generated by the zone z
          GenerationShare(m)(dt)(h)(l)(zone) ← GenerationCounter(m)(dt)(h)(l)(z) / zoneGenerationCounter(m)(dt)(h)(zone)
        end for
        if EXPLICIT_PATH_COMPUTATION then
          for each link l, zones z1, z2 in GenerationDestCounter(m)(dt)(h) do
            GenDestShare(m)(dt)(h)(l)(z1)(z2) ← GenerationDestCounter(m)(dt)(h)(l)(z1)(z2) / zoneDestGenerationCounter(m)(dt)(h)(z1)(z2)
          end for
        end if
      end for
    end for
  end for
end procedure
```

FIG. 6E

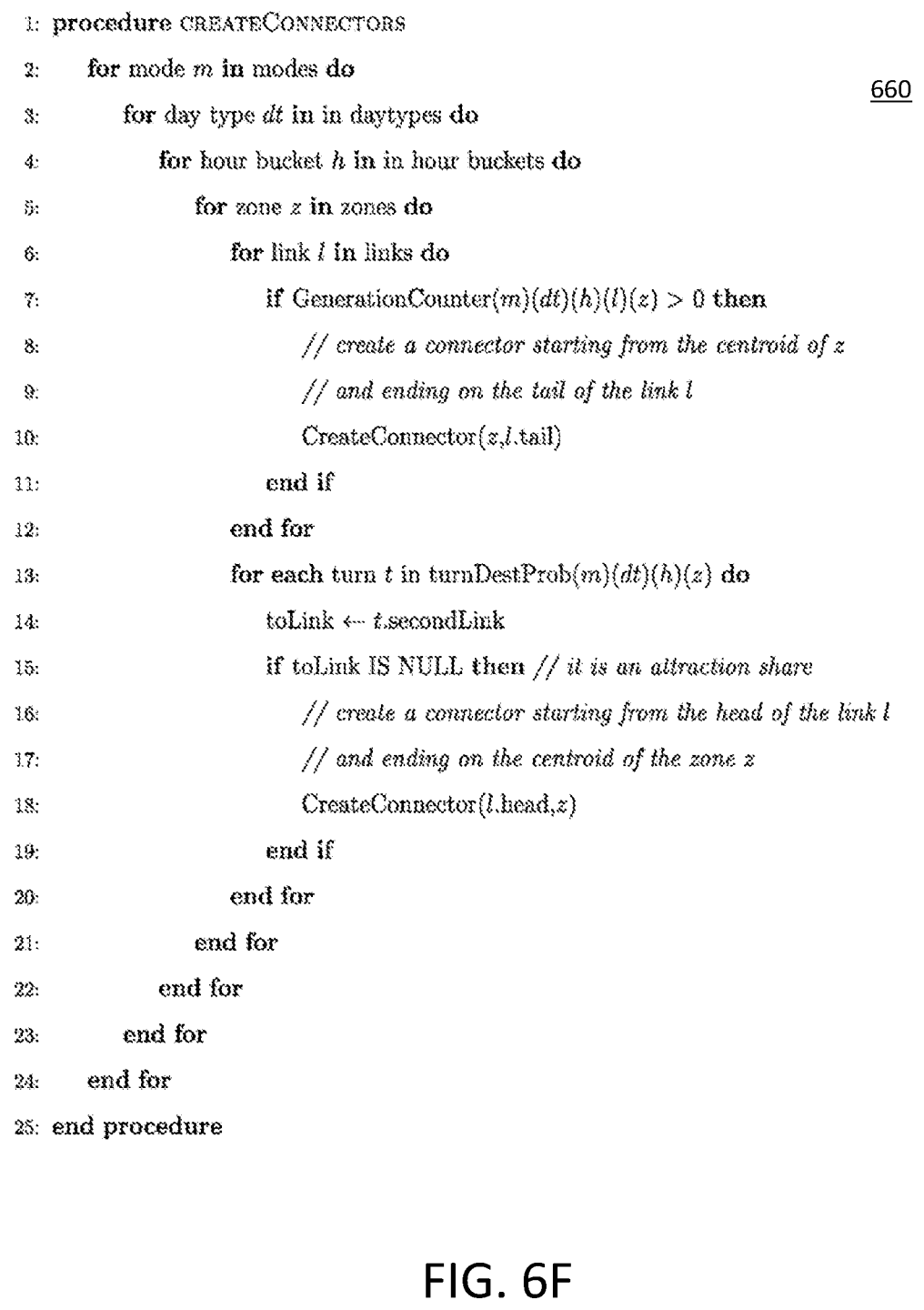

660

```
procedure CREATECONNECTORS
    for mode m in modes do
        for day type dt in in daytypes do
            for hour bucket h in in hour buckets do
                for zone z in zones do
                    for link l in links do
                        if GenerationCounter(m)(dt)(h)(l)(z) > 0 then
                            // create a connector starting from the centroid of z
                            // and ending on the tail of the link l
                            CreateConnector(z,l.tail)
                        end if
                    end for
                    for each turn t in turnDestProb(m)(dt)(h)(z) do
                        toLink ← t.secondLink
                        if toLink IS NULL then // it is an attraction share
                            // create a connector starting from the head of the link l
                            // and ending on the centroid of the zone z
                            CreateConnector(l.head,z)
                        end if
                    end for
                end for
            end for
        end for
    end for
end procedure
```

FIG. 6F

COMPUTER SYSTEM AND METHOD FOR STATE PREDICTION OF A TRAFFIC SYSTEM

CROSS-REFERENCE TO RELATED APPLICATION

This application claims priority to, and is a continuation of PCT/EP2018/064010, filed on May 29, 2018 and entitled "COMPUTER SYSTEM AND METHOD FOR STATE PREDICTION OF A TRAFFIC SYSTEM", which in turn claims priority to EP Application No. 17175171.2 filed on Jun. 9, 2017, both of which are hereby incorporated by reference.

TECHNICAL FIELD

The present disclosure generally relates to traffic control, and in particular to systems and methods for predicting the state of a traffic system to control the traffic system.

BACKGROUND

Ever increasing traffic density is causing a more and more increasing load on existing traffic systems. In the context of this document a traffic system includes a traffic infrastructure which allows the movement of real world traffic participants. The traffic infrastructure includes a network of infrastructure elements, such as for example, roads, highways, pavements, bridges, water routes for ferry boats, etc. which allows traffic participants, such as for example, any kind of road vehicle (e.g., cars, bikes, buses), boats (e.g., ferries), trains, pedestrians, etc., to move from an origin location to a destination location. Further, the traffic infrastructure includes all kinds of traffic control means, such as for example, controllable traffic signs (e.g., traffic lights, dynamic speed limit signs, dynamic warning signs), crossing gates, retractable bollards, etc., which selectively can allow or deny traffic participants to actually use certain parts of the infrastructure network.

Operators can control the traffic control means typically via a traffic management and control system (referred to as traffic control system). For example, in case of high traffic volume in a particular direction, priority may be given to this direction by switching the traffic direction on a particular lane by changing a corresponding sign. Traffic light signal switching cycles can also be adjusted to a particular traffic situation. For the operators of the traffic control system it is advantageous to know about the future traffic situation to anticipate situations where traffic congestion is to be expected and take preventive counter measures by sending respective control signals to the traffic control means of the traffic infrastructure. Such short term measures may be complemented by long term measures where in some situations the information about the future traffic situation may even be used to extend the traffic infrastructure in accordance with the future needs.

SUMMARY

There is therefore a need to improve traffic forecast (i.e., predicting future states of the traffic system) in that more realistic forecasts are provided to operators of a traffic control system prompting the operators with state information which enables them to take precautionary actions for ensuring smooth traffic flow in the traffic system.

This technical problem is solved by a computer system, a computer-implemented method and a computer program product according to the independent claims. In one embodiment, said computer-implemented method for predicting the state of a traffic system is executed by said computer system which is running said computer program product. The computer-implemented method supports an operator to control the traffic system based on predicted states of the traffic system. Thereby, the proposed embodiments are all based on a data driven approach which takes benefit from real world location data which are tracked by respective location sensors.

Initially, the computer system receives time-stamped location data of a plurality of traffic participants measured during a time period wherein the time-stamped location data represents a plurality of trajectories reflecting the movements of the plurality of participants during the time period. In other words, time-stamped location data in relation to a traffic participant indicates a sequence of locations that the participant went through during the movement. Such a sequence is also referred to as trajectory. For example, time-stamped location data of traffic participants can be GPS data records for a respective traffic participant (e.g., a vehicle). While the traffic participant is moving though the traffic infrastructure a GPS system mounted on the traffic participant can the geo-location coordinates of the GPS system (i.e. of the traffic participant) at various time points. The sequence of such determined locations over time reflects the trajectory of the traffic participant over time. Other methods for determining the location data may be used as well (e.g., triangulation methods based on cellular signals). The location data may be received through any appropriate interface module which supports the exchange of GPS like data structures. Time-stamped location data is sometimes also referred to as Floating Car Data (FCD).

The time-stamped location data is then provided to at least one map matching module. Map matching modules are known in the art. They serve the purpose to match real world trajectory data measured via location sensors to elements of a graph representing at least a part of the traffic infrastructure. The one or more map matching modules may be part of the computer system or they may be external modules provided by remote computers (e.g., cloud server computers). The amount of time-stamped location data to be processed can be enormous. Therefore, it can be advantageous to use multiple map matching modules for processing such data in parallel and multiple computing devices. The independency of the trajectories with their location data allows parallelization of the map matching process.

The result of the map matching process is then received by the computer system from the one or more map matching modules in the form of a link sequences associated to each trajectory. Each link represents a real world connection corresponding to a portion of a measured trajectory mapped to a corresponding element of a road graph wherein the road graph (or infrastructure graph) represents the complete road infrastructure available in a given geographic area.

Based on the time-stamped location data of the mapped trajectories, a speed profile module of the computer system determines time dependent speed profiles for the received links. In one embodiment, the speed profile module may receive, from the one or more map matching modules, for each link one or more time dependent trajectory specific speed profiles indicating average speed values during respective time intervals. Thereby, each speed value is associated with a respective mapped trajectory. That is, for each link multiple average speed values may be received where each average speed value originates from a different trajectory of a respective traffic participant passing this link.

Then the speed profile module can aggregate the trajectory specific speed profiles for each link wherein the aggregate speed values at particular points in time (or during particular time intervals) are based on the trajectory specific speed values of all trajectories mapped to the respective link. In other words, for each link the system determines and average value of all trajectory specific average speed values for particular point in time (time interval). Determining the time dependent speed profiles based on time-stamped location data provides robust and reliable speed profiles.

The above infrastructure road graph which is used for map matching purposes differs from the so-called assignment graph. The infrastructure graph reflects a fully detailed transportation network over which people are moving. The assignment graph includes a sub-selection of the infrastructure graph which is created based on transportation and traffic criteria. The assignment graph is a connected graph and represents the part of the infrastructure which is able to explain the traffic behavior. In other words, the assignment graph includes such elements of the infrastructure graph on which the majority of the traffic flows occurs. Traffic forecast is provided based on the assignment graph. After the map matching is done, the information relevant for the traffic forecast (information related to the assignment graph) is automatically transferred from the infrastructure graph to the assignment graph in accordance with a priori (predefined) knowledge of the mapping relationships between the two graphs. Assignment graphs can be generated to some extent based on real world traffic data. However, in many cases amendments to the generated graphs are made by transportation engineers.

Based on the time-stamped location data of the mapped trajectories, a turn probability module of the computer system determines time dependent turn probabilities from each link to each possible successive link of the assignment graph. A turn probability reflects at a given forking (e.g., an intersection), the percentage of traffic participants taking a particular turn at a particular point in time (or for a particular time period). In other words, time dependent turn probabilities reflect the real world traffic flows at forking locations in the assignment graph during particular time intervals. Using this information for the state prediction makes the prediction result more reliable.

Based on the time-stamped location data of the mapped trajectories, an attraction share module of the computer system determines time dependent attraction shares corresponding to time dependent turn probabilities from links belonging to the assignment graph toward successive links not belonging to the assignment graph. In other words, the turn probabilities corresponding to exit flows from the assignment graph (traffic flows leaving the assignment graph) are referred to as attraction shares. A particular attraction share describes a turn probability from a link of the assignment graph to a possible successive link of the infrastructure (road) graph that is not part of the assignment graph. An attraction share reflects at a given forking (e.g., an intersection) of the infrastructure graph, the percentage of traffic participants exiting the assignment graph at a particular point in time (or for a particular time period). In other words, time dependent attraction shares reflect the real world traffic flows at forking locations in the road graph during particular time intervals where the flows are moving from the assignment graph to the road graph. In this embodiment, the time dependent traffic parameters for providing the forecast further include the time dependent attraction shares. Attraction shares further improve the accuracy and reliability of the traffic state prediction Based on the time dependent traffic parameters including the speed profiles, turn probabilities, and attraction shares, in conjunction with at least one existing time-dependent origin-destination-matrix and a suitable Sequential Dynamic Traffic assignment methodology, a state prediction module of the computer system can determine a forecast of the state of the traffic system for a given future time point. This determination can be performed automatically and in near-real-time allowing to reliably predict the traffic state condition with a near-real-time system response to enable the operator to react properly, in time and possibly proactively. Near-real-time system response, as used herein, means that a computation in response to the received location data (which can be real-time traffic data) is only delayed by the time delay introduced, by automated data processing or network transmission, between the occurrence of an event and the use of the processed data, such as for display or feedback and control purposes. For example, a near-real-time display depicts an event or situation as it existed at the current time minus the processing time, as nearly the time of the live event. This state forecast is then provided to an operator of the traffic control system to prompt the operator with technical traffic state information which is relevant to control the traffic flow.

The proposed forecasting approach uses an advanced methodology including models and algorithms for the dynamic simulation of transport systems. This allows offline and near-real-time estimation and forecast of travel times, traffic flows and/or vehicle queues. Estimations and forecasts are generated based on predicted and measured (unpredicted) mobility data of traffic participants and/or events occurring on the monitored transport network (as reflected by the infrastructure/assignment graphs). Thereby, historical traffic flow data and continuously observed real-time traffic state information is used.

Once the state prediction model and the reference traffic conditions are available, the reference traffic conditions are combined with measurement data (i.e. the time stamped location data) coming continuously from the field into a near-real-time traffic model which can adjust the traffic estimations and forecasts to the measured traffic conditions of a particular day. For example, the respective computations can be executed completely automatically and continuously which allows to produce a new traffic estimate and forecast, for example, every few minutes.

The reference transport model can be built using classical transport modelling techniques starting from census and network data. It can be calibrated in order to reproduce average traffic measurements (i.e. average observed traffic conditions for particular day types). In turn, average traffic measurements can be obtained from archived real-time measurements by suitable data clustering procedures.

Then, a dynamic assignment is calculated using a Sequential Dynamic Traffic assignment methodology. For example, the dynamic assignment can be calculated by using the Dynamic User Equilibrium (DUE) model. Firstly, the dynamic assignment may be used off-line on the base transport model to calculate the evolution of link flows, queues, travel times and path choices over different time intervals within each typical day.

Secondly, the dynamic assignment may be used online (near-real-time), where a Sequential Dynamic Network Loading (SDNL) model is responsible for putting together real-time traffic flow measurement data and event effects with the same reference transport model used by DUE and with the reference traffic behavior represented by reference path choices. For example, event effects include, but are not limited to, speed reductions, capacity constraints (e.g., a lane management event may reduce the capacity of the road while a safety based event could open a shoulder lane increasing the capacity), change of green light phase shares at intersections with traffic light signals, etc.

The mathematical model underlying SDNL is based on an explicit representation of traffic phenomena, with particular reference to flow and congestion propagation. In particular, this method adopts as its simulation engine the General Link Transmission Model (GLTM). Particular features of the GLTM are: the possibility to adopt a fundamental diagram with general shape; complete representation of general intersections, even signalized; no need for spatial discretization of links (contrary, for example, to the Cell Transmission Model). In these respects, the proposed modelling approach differs from micro-simulation in which individual vehicles are operated as separate elements. Therefore, the GLTM is computationally faster than microscopic simulations which allows the simulation of larger or more detailed networks.

In order to obtain a continuous update of the traffic forecast, the GLTM is sequentially applied with a rolling horizon schema, exploiting the base transport model, the traffic measurements and events gathered from monitored links.

Specifically, a continuously updated traffic flow forecast is achieved by performing a sequence of real-time dynamic traffic propagations over the network (assignment graph) in rolling horizon. To correctly implement the rolling horizon context, each simulation (forecasting) step adopts as initial conditions the traffic state calculated by the previous simulation step in correspondence to its initial instant. That is, the forecasting steps do not start with the initial conditions of an empty network. This allows to propagate or transmit a congestion situation from one simulation step to the next one making sure that previously calculated queues and/or measure-derived variations are inherited.

As already mentioned, traffic measurement data and events collected continuously from the field are used on-line to correct the propagation of the demand flows produced by GLTM on the network.

In more detail, on each monitored link and time interval an additional flow is introduced (in the algebraic sense) equal to the difference between the observed flow value (measured in real-time) and the flow value calculated by the network loading model for the same time interval. The additional flow is propagated on the network. In other words, interpreting the additional flow in algebraic sense means that it can be positive if the observed flow is greater than the calculated one, or it can be negative if the observed flow is less than the calculated flow. The additional flow is added (and thus propagated) to the calculated flow value. That is, the measured flow is propagated while taking into account the capacity constraints of the prediction model.

For example, if a measured flow is recognized to be critical, indicating that the effect of an active downstream capacity constraint reached the monitored link (e.g., in the form of a vehicle queue), then the capacity of the link may be set equal to the measured flow.

While the forecast computation is running, the above corrections propagate on the network from the road section where they were generated, both upstream (as queues) and downstream (as flow variations), in coherence with traffic flow theory implemented within the GLTM. Thus, evolution over time of link flows results from three contributions:

one contribution produced from the demand loaded on the network;

one contribution obtained by the downstream propagation of additional flows generated on all monitored links;

one contribution produced by the upstream propagation of queues generated by capacity constraints imposed in correspondence of critical observed flows.

In one embodiment, the prediction module may group the time dependent traffic parameters by predefined day types. A particular day type classifies a particular average traffic behavior of the traffic system during the day. Grouping may include averaging the time dependent parameters over a plurality of days having the same day type. For example, traffic flow behavior reflected by the time-dependent location data may show different characteristics for working days, weekends, public holidays, beginning/end of vacation periods, etc. Respective day types can be defined to reflect this behavior. Then the averaging of the time dependent parameters for multiple days with the same day types can further improve the reliability of the traffic state predictions.

In one embodiment, the prediction module may include a zoning module. The zoning module can receive a plurality of zone definitions (zone specifications). The zones may be specified such that each zone covers a portion of the assignment graph so that the starting point of each measured trajectory is assigned to a respective origin zone and the end point of each measured trajectory is assigned to a respective destination zone. Zoning may also support overlapping zones. Zoning allows to improve the previously disclosed turn probability feature by allowing for the computation of destination based turn probabilities which is described in more detail in the detailed description.

In an embodiment using zoning, a generation share module may be included in the prediction module. Based on the time-stamped location data of the mapped trajectories, the generation share module can determine, time dependent generation shares. A particular generation share is the time dependent ratio between the number of trajectories starting in a particular zone and entering the assignment graph on a particular link of the assignment graph, and the total number of trajectories starting in the particular zone/area. In this embodiment, the time dependent traffic parameters for providing the forecast further include the time dependent generation shares. In other words, the generation share for a particular link with regards to a particular origin zone, can be determined as the ratio of the number of trajectories starting in a particular origin zone, and entering the assignment graph on a given link of the assignment graph, and the total number of trajectories started in the particular origin zone. Generation shares further improve the accuracy and reliability of the traffic state prediction.

In one embodiment, the prediction module can construct a plurality of sample origin-destination-matrices for a day type period. A sample origin-destination-matrix quantifies the flow of traffic participants between two zones of the assignment graph during predefined time intervals within the day period. The contributions of a particular trajectory to the sample origin-destination-matrix is counted for the time point when the particular trajectory enters a particular origin zone. The constructed sample origin-destination-matrices complement the pre-existing time-dependent origin-destination-matrix with real world traffic flow based data and contribute to a more reliable and accurate prediction of the traffic state. In other words, the pre-existing time-dependent origin-destination-matrix can be modified or updated with the contributions of the sample origin-destination matrices.

In one embodiment with zoning, the prediction module can generate a plurality of entry and exit connectors. An entry connector is a logical link in the assignment graph which directly connects an origin zone to a corresponding entry link (i.e. the link which defines the generation share), where one or more trajectories enter the assignment graph. An exit connector is a logical link in the assignment graph, where the attraction shares are defined, which directly connects an exit link where one or more trajectories exit the assignment graph to the corresponding destination zone. In other words, connectors can be seen as short cuts connecting directly an origin zone with a corresponding destination zone. Connectors are therefore injected to and absorbed from the assignment graph and allow to distribute the volume of the demand matrices from several zones through specific points in the assignment (or transportation) network.

In one embodiment with zoning, the prediction module further can determine time dependent turn probabilities by destination because the destination zones of traffic participants (i.e. of the respective trajectories) are known.

In one embodiment with zoning, the state prediction module further can generate a plurality of explicit time dependent origin and destination path probabilities, wherein an explicit time dependent origin and destination path probability is defined as the probability that a given sequence of consecutive links of the assignment graph is used by all mapped trajectories starting in a given origin zone and ending in a given destination zone.

In one embodiment, a computer program product includes instructions that are loaded into a memory of the disclosed computer system and executed by at least one processor of the computer system to cause the processor to perform the herein described functions and computer-implemented methods.

In one embodiment, a computer-implemented method is provided for learning a state prediction model to be used for forecasting the state of a traffic system. The traffic system includes a traffic infrastructure configured to allow the movement of real world traffic participants. The method includes: receiving time-stamped location data of a plurality of traffic participants measured during a time period wherein the time-stamped location data represents a plurality of trajectories reflecting the movements of the plurality of participants during the time period; providing the time-stamped location data to at least one map matching module; receiving, from the at least one map matching module, a plurality of links wherein each link represents a real world connection corresponding to a portion of a measured trajectory mapped to a corresponding element of a traffic infrastructure graph; receiving an assignment graph including a subset of connected elements of the infrastructure graph wherein the subset is selected based on predefined transportation and traffic criteria; determining, based on the time-stamped location data of the mapped trajectories, time dependent speed profiles for the received links; determining, based on the time-stamped location data of the mapped trajectories, time dependent turn probabilities from each link to each possible successive link of the assignment graph; determining, based on the time-stamped location data of the mapped trajectories, time dependent attraction shares corresponding to time dependent turn probabilities from links belonging to the assignment graph toward successive links not belonging to the assignment graph; and storing the time dependent traffic parameters including the speed profiles, turn probabilities, and attraction shares as part of the state prediction model to be used in conjunction with at least one existing time-dependent origin-destination-matrix and a suitable Sequential Dynamic Traffic assignment methodology. The time dependent traffic parameters can be stored in any appropriate data structure of a respective memory component.

A person skilled in the art can also provide a corresponding computer program product and a computer system to run the computer program product for executing the method for learning the state prediction model.

Further aspects of the implementations described herein will be realized and attained by means of the elements and combinations particularly depicted in the appended claims. It is to be understood that both, the foregoing general description and the following detailed description are exemplary and explanatory only and are not restrictive of the implementations as described.

BRIEF DESCRIPTION OF THE DRAWINGS

FIGS. 6A to 6F illustrate example pseudo codes implementing various functions of the system modules according to various embodiments.

DETAILED DESCRIPTION

Figure 1:
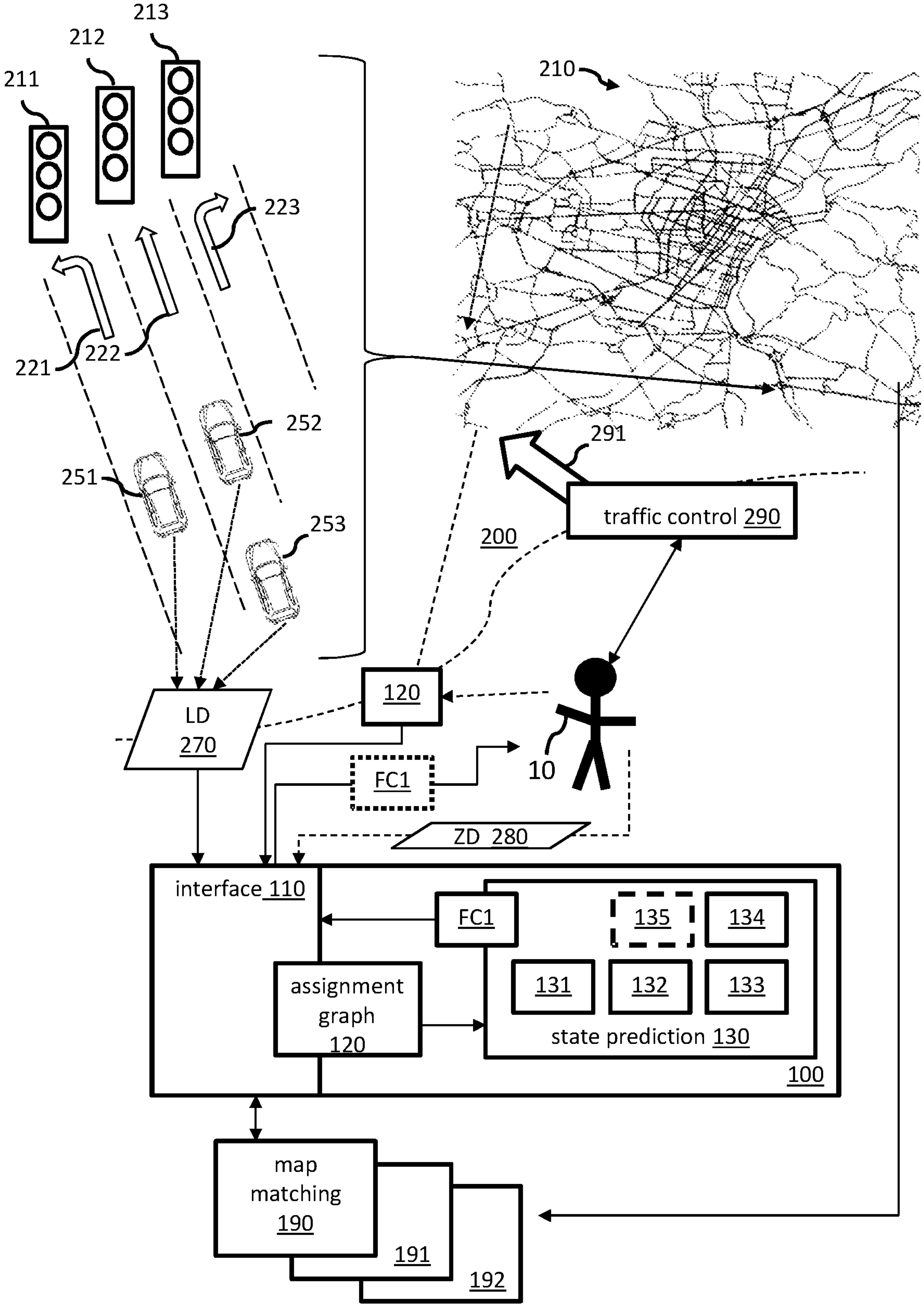
FIG. 1 shows a simplified block diagram of a computer system for state prediction of a traffic system according to one embodiment of the invention.
Figure 2:
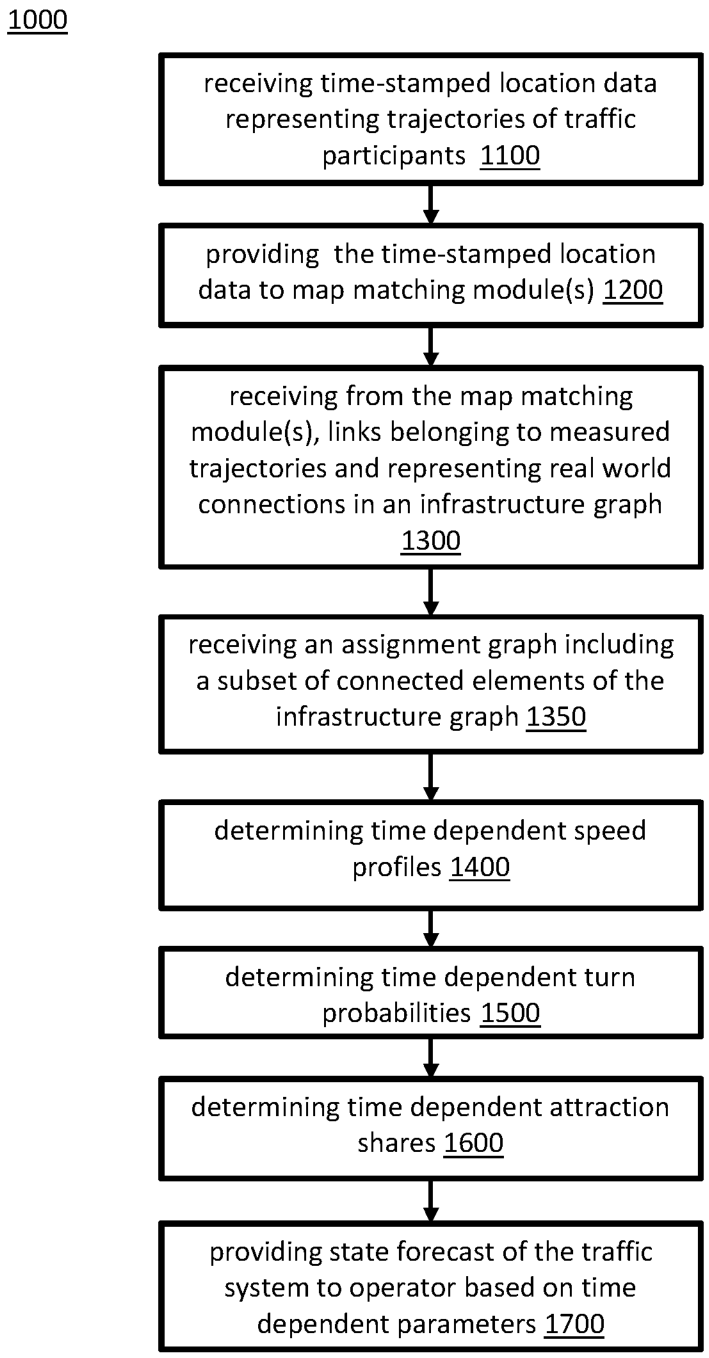
FIG. 2 is a simplified flow chart of a computer-implemented method for state prediction of a traffic system according to one embodiment of the invention.

FIG. 1 shows a simplified block diagram of a computer system 100 for state prediction of a traffic system 200 according to one embodiment of the invention. FIG. 2 is a simplified flow chart of a computer-implemented method 1000 for state prediction of a traffic system according to one embodiment of the invention. The computer-implemented method 1000 can be performed by the computer system 100 when a respective computer program is loaded into the computer system 100 and is executed by one or more processors to the computer system. In the following description, FIG. 1 is described in the context of FIG. 2. Therefore, the reference numbers relate to FIG. 1 or FIG. 2 unless explicitly referring to another figure.

The computer system 100 supports an operator 10 to control the traffic system 200. As stated earlier, the traffic system 200 includes a traffic infrastructure configured to allow the movement of real world traffic participants. That is, traffic participants can physically move on elements of the traffic infrastructure. The upper left of FIG. 1 shows by example three traffic participants (cars 251 to 253) approaching an intersection on a road with three lanes 221 to 223 (left turn, straight, right turn). This part of the traffic infrastructure is a magnification of an intersection in the infrastructure graph 210 in the upper right part of FIG. 1 (indicated by the curly bracket and the arrow pointing to the intersection). The infrastructure graph 210 represents all real world connections of the traffic infrastructure being of interest for traffic state predictions (real world connections where traffic participants actually move). Further, the traffic infrastructure in the example includes traffic lights 211 to 213 as traffic control means. Traffic control means of the traffic infrastructure can be controlled 291 via a traffic management and control system 290 by the operator 10 or by a computer system (e.g., a rule based computer system which can take control decisions based on predefined rules). The traffic participants 251 to 253 are equipped with location sensors (e.g., GPS sensors) and can communicate time-stamped location data (LD) 270 to the computer system 100. For example, LD 270 may be communicated over a wireless Internet connection via a cellular communication network running on an appropriate mobile communication protocol.

The computer system 200 is learning a state prediction model which can later be used for forecasting the state of a traffic system. Based on the time-stamped location data, dependent traffic parameters are determined as part of the state prediction model during the model learning phase time. The determined parameters are stored as part of the prediction model to be used in conjunction with at least one existing time-dependent origin-destination-matrix and a suitable Sequential Dynamic Traffic assignment methodology for traffic state forecasting.

LD 270 is received 1100 by an interface module 110 of the computer system 200. As shown in FIG. 1, the received time-stamped location data 270 relate to a plurality of traffic participants 251 to 253. LD 270 is measured during a certain time period. For example, the location data may be tracked for the entire infrastructure (reflected by infrastructure graph 210) for a day, multiple days or even one or more weeks. Tracking LD 270 over relatively long time periods (one day or more) improves the statistical relevance of the location data samples. LD 270 represents a plurality of trajectories reflecting the movements of the plurality of participants during the (tracking) time period with a particular trajectory corresponding to a particular trip of a particular traffic participant. For example, car 251 is driving on the left turn lane 211 of the road segment approaching the intersection which is controlled by traffic light 211. The trajectory of car 251 is defined by the locations measured by all time-stamped location data which were recorded earlier for car 251 and all locations which will be measured during the forthcoming trip. In this example, car 251 will likely turn left and its trajectory will depart from the trajectories of cars 252, 253 which are supposed to further move straight ahead as they move on the middle lane 222 controlled by traffic light 212. The example illustrates that the trajectories of different traffic participants can include the same road segments for certain parts of the infrastructure, but can also depart (or merge) when traffic participants take turns during their trips.

For predicting the state of the traffic system 200, the information about the measured real world trajectories is used wherein the measured trajectories correspond to subsets of the entire infrastructure. Therefore, there is no need to perform traffic forecast computations based on the entire infrastructure as reflected by the infrastructure graph 210. It is sufficient to use such parts of the infrastructure graph where traffic flow really occurs. Therefore, from a resource consumption and system performance perspective, it is advantageous to filter the entire infrastructure graph 210 in such a way that only graph elements which form part of real world trajectories are taken into consideration for the following computational steps. For this purpose, the received LD 270 is provided 1200 to at least one map matching module 190 to 192. The one or more map matching modules 190 to 192 determine a plurality of links wherein each link represents a real world connection corresponding to a portion of a measured trajectory mapped to a corresponding element (edge) of the infrastructure graph 210 representing the traffic infrastructure. That is, the infrastructure graph 210 is used by the map matching module(s) as input for determining the links. Because the various trajectories are totally independent the map matching task can be fully parallelized, and the map matching computations can be performed in parallel for different trajectories by multiple map matching modules to benefit from multi-processor/multi-core computing hardware. Thereby it is irrelevant whether the map matching process is performed by the computer system 100 or by one or more remote computing devices which are communicatively coupled with the computer system 100 via its interface 110.

Further, the computer system 100 receives an assignment graph as a further input for the traffic state forecast determination. The assignment graph 120 includes a subset of connected elements of the infrastructure graph 210 wherein the subset is selected based on predefined transportation and traffic criteria. For example, a transportation engineer may extract such parts from the infrastructure graph 210 which are relevant to traffic state forecasting.

The computer system 100 further includes a state prediction module 130. The state prediction module 130 can perform the functions necessary to compute state predictions of the traffic state based on time dependent parameters which can be derived from the time dependent location data LD 270 of the mapped trajectories.

A speed profile function of the state prediction module 130 determines 1400 time dependent speed profiles 131 for the received links based on the time-stamped location data of the mapped trajectories. In one embodiment, the state prediction module 130 receives, from the one or more map matching modules, for each link one or more time dependent trajectory specific speed profiles indicating average speed values during respective time intervals wherein each speed value is associated with a respective mapped trajectory. The speed profile function can then determine the time dependent speed profiles by aggregating the trajectory specific speed profiles for each link wherein the aggregate speed values are based on the trajectory specific speed values of all trajectories mapped to the respective link.

After map-matching the measured trajectories to the infrastructure (road) graph 210, a mean speed value can be provided for all graph elements (edges of the graph) which are included in at least one of the mapped trajectories (i.e. for the received links). Such mean values may be computed by averaging the speed values for a given link. In one embodiment, the speed values may be aggregated by day-types and corresponding time points or time intervals during the day as defined by configuration. For example, the time window for aggregating speed values may be one hour, leading to 24 time windows per day. The length of time windows does not need to be the same for all time windows. For example, during night hours traffic flows may be very low and longer time windows can be sufficient (e.g., a time window aggregating between 11 pm and 5 am), whereas during rush hours shorter time windows may be used for aggregating. Moreover, if the trajectories can be distinguished by vehicle classes, a vehicle class specific speed profile can be aggregated separately for each vehicle class. Vehicle class specific speed profiles provide a higher granularity with regards to speed profiles on certain links associated with the respective vehicle classes. This allows to further increase the accuracy of the traffic state forecasts. For the average value of each link the standard deviation and the size of the sample may be provided.

For each mapped trajectory, the speed values can be determined by the map-matching algorithm. The speed values may be computed to be proportional to reference speeds of the underlying graph elements (links or sequences of links corresponding to e.g. roads). For example, if a trajectory covers two links representing infrastructure elements of equal length where the reference (or base) speed of the first link is twice the reference speed of the second link the computed speed value for the first link is twice the speed value of the second link.

Figure 3A:
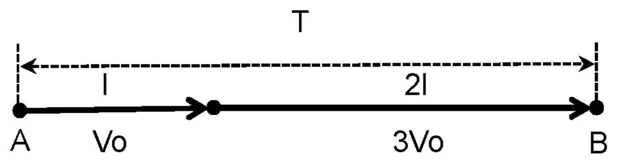
FIGS. 3A, 3B illustrate two example embodiments for the computation of speed values for respective links.

FIG. 3A illustrates a more complex example describing this computation. T is the elapsed time interval between two consecutive time dependent location data A, B (e.g., GPS points). A is at the beginning of the left link and B is at the end of the right link (each link represented by an arrow). The link lengths and reference speed values are 1, Vo, 2 l, 3 Vo respectively. The reference speed is a given input associated with each element of the infrastructure graph. It either corresponds to a speed limit associated with the respective element or it corresponds to a reasonable hypothesis of the maximum speed on that link (also called free flow speed). Because the total travel time is fixed to T and the ratio between the base travel times (that is equal to the ratio between the link length and its reference speed) is given, the actual travel times can be computed. On the left link, the actual travel time is equal to 3 T/5. On the right link, the actual travel time is equal 2 T/5.

Figure 3B:
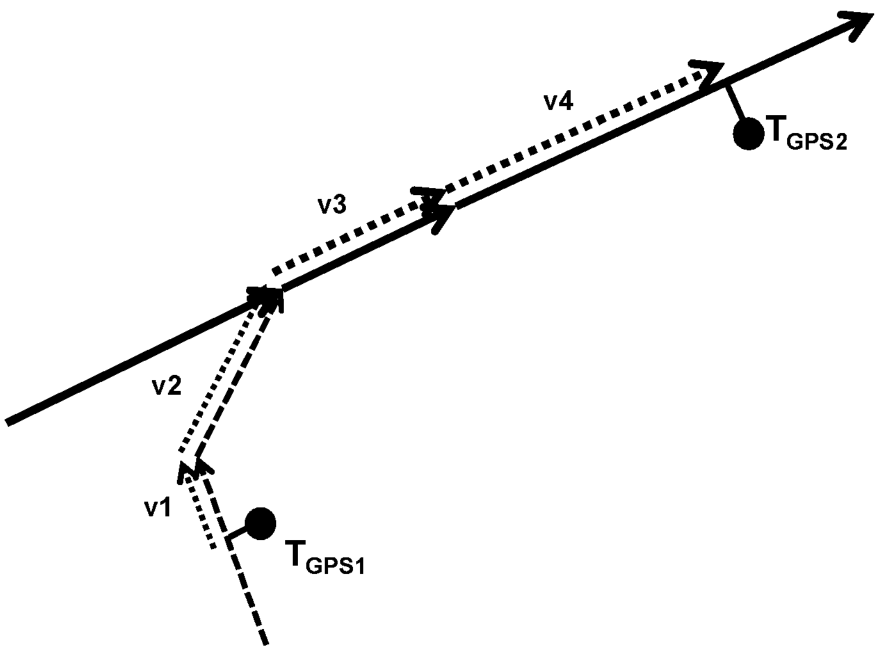

FIG. 3B shows in more detail how the speed values can be computed based on the assumption that the estimated speeds are proportional to the respective reference speed values. This hypothesis avoids obtaining equal speed values on links with same length but different reference speed values. For example, in the situation described in FIG. 3B it is more realistic to have lower speed values on on-ramp street links than on street links corresponding to highway segments. In the example, bold line arrows correspond to graph edges representing a highway with 130 km/h reference speed value. Dashed arrows correspond to graph edges representing an on-ramp street element with 40 km/h reference speed value. Dotted arrows indicate mapped trajectory segments (links) with associated speed values v1 to v4. If the first GPS point TGPS1 is on the ramp and the second one TGPS2 is on the highway, the speed profile algorithm assigns different speed values to the highway links dependent on their distance from the ramp. That is the v3 value is computed as a lower value than the v4 value. In mathematical formulas this problem can be described as follows:

$$\text{Constraint } t_{final} - t_{initial} = \sum_{\{i=1\}}^{n} \frac{l_i}{v_i}$$

To be computed: $v_i$, i=1, . . . n

Hypothesis:

$v_i$=Q $w_i$ i=1, . . . n, Q∈ℝ where $w_i$ are reference speed values of respective links $$\text{Coefficients: } Q = \frac{\sum_{\{i=1\}}^{n} l_i / w_i}{(t_{final} - t_{initial})}$$

t_final and t_initial correspond to the timestamps of two subsequent GPS points. Their difference is the actual travel time experienced and recorded by the GPS unit. This time is a constraint because it is configured to be equal to the sums of all travel times on the links connecting the two GPS points on the infrastructure graph as stated by the map-matching module. Given that all the link lengths are given, one has to find all the speed values v_i on these links such that the time constraint is satisfied. That is, n variables are to be found but only the constraint equation is given. Therefore, a further assumption is made to solve the problem. The assumption is that all the speed values v_i to be found are linearly proportional to the reference speed of the link with the same proportionality constant Q. This allows to reduce the number of unknowns from n to just 1, i.e. Q. Given the two subsequent GPS points, we know their timestamps that in the formula are t_final and t_initial.

Turning back now to FIGS. 1 and 2, the state prediction module 130 determines 1500, based on the time-stamped location data of the mapped trajectories, time dependent turn probabilities 132 from each link to each possible successive link of the assignment graph 120. In other words, at each fork (or intersection) of the assignment graph at least a first traffic participant has passed on a trajectory taking a first turn direction at the fork and at least a second traffic participant has passed on a trajectory taking at least a second turn direction at the fork. Because the assignment graph 120 only includes links where traffic participants actually moved during their trips, for each turn a real traffic flow exists which allows the determination of such time dependent turn probabilities. That is, turn probabilities can be extracted for example from FCD trajectories for a transportation model at a particular intersection as the percentage of people taking a turn at the intersection.

Turn probabilities represent real world people route choice behaviour. Moreover, in conventional traffic demand prediction approaches, the sum of the turn probabilities for every intersection typically sums up to one. However, in real world traffic scenarios this may not necessarily be the case. For example, if the infrastructure graph 210 at a given intersection has less turn options than the represented real world intersection, it can happen that FCD trajectories are observed which are not included in the model graph 210. The Data Driven Model approach as described in this disclosure aims to determine turn probabilities as they are effectively observed in the real world via the FCD information. As a consequence, in some cases they may not necessarily sum up to one for some intersections of the assignment graph 120 because some real world trajectories may have no counterpart on the assignment graph and, therefore, cannot be mapped to respective links. In other words, from a modelling point of view, traffic flow at such intersections is destroyed. That is, at each intersection the turn probabilities sum up to one when also considering the destroyed flows (attraction shares).

Figure 4A:
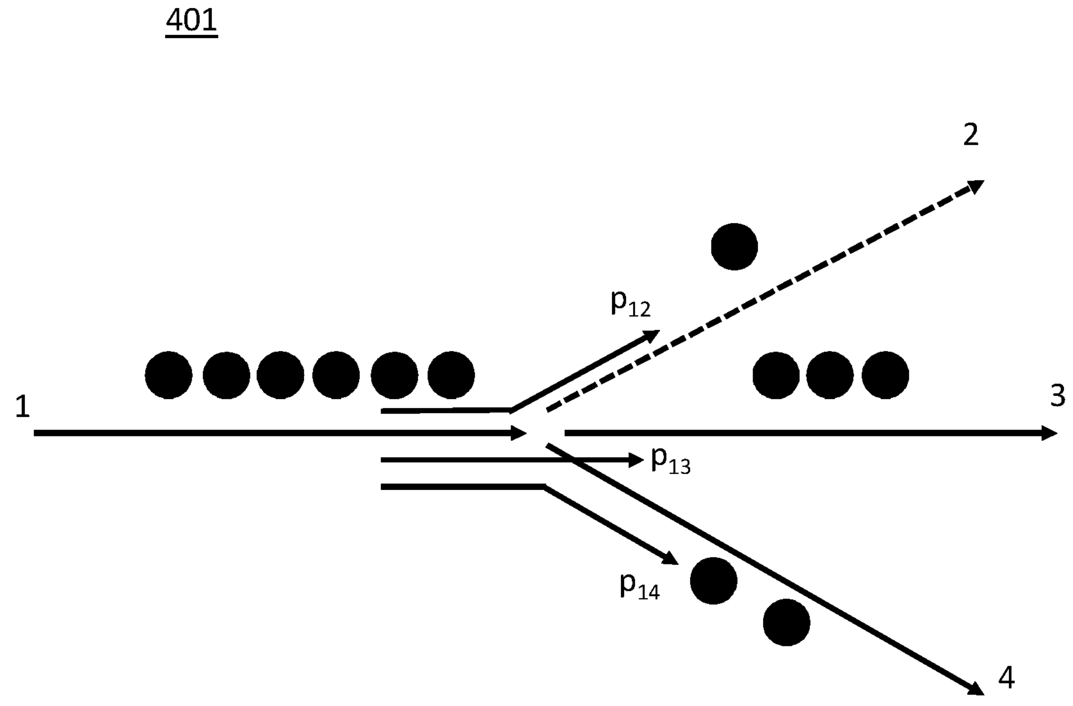
FIGS. 4A, 4B illustrate two example embodiments for determining time dependent turn probabilities.

FIG. 4A shows an example of an intersection 401 with link 1 being succeeded by two links 3, 4 which relate to mapped trajectories. However, the dashed link 2, which is part of the infrastructure graph, is not included in the assignment graph but nevertheless there is a trajectory using the turn 1-2. The black bullets represent the traffic participants passing the respective links. One of the six participants passing link 1 turns to link 2, three participants turn to link 3 and two participants turn to link 4. In this example the following turn probabilities are determined: p12=1/6 (corresponding to an attraction share, because the flow leaves the assignment graph), p13=3/6, p14=2/6. Note that the sum of all turn probabilities sums up to one. However, this is not the case regarding the subset of turns 1-3, 1-4 (p13 and p14) reflected by the assignment graph.

Turning back now to FIGS. 1 and 2, the state prediction module 130 further determines 1600, based on the time-stamped location data of the mapped trajectories, time dependent attraction shares 133 which correspond to time dependent turn probabilities from links belonging to the assignment graph toward successive links not belonging to the assignment graph. In other words, turn probabilities corresponding to the exit flows from the assignment graph 120 are called attraction shares (cf. p12 in FIG. 4A). Attraction shares are a measure for the percentage of traffic participants leaving the traffic infrastructure portion represented by the assignment graph 120.

Finally, the state prediction module 130 determines a forecast FC1 of the state of the traffic system 200 for a given future time point based on the time dependent traffic parameters including the speed profiles 131, turn probabilities 132, and attraction shares 133, in conjunction with at least one existing time-dependent origin-destination-matrix 134 and a suitable Sequential Dynamic Traffic assignment methodology. The determined state forecast FC1 is then provided 1700 to the operator 10 via the interface 110 to enable the operator to interact 291 with the traffic system 200, e.g., via a traffic control module 290, in response to the state forecast FC1. Standard user interface technology can be used to convey the forecast FC1 to the operator 10. In an alternative embodiment, the determined state forecast may also be used as input to an automated rule-based traffic-flow control system which can take traffic flow control decisions autonomously based on the state forecast data.

The modelling paradigm adopted within the forecast engine of the state prediction module 130 is based on the physical interpretation of the observed traffic phenomena (e.g., how the traffic flow evolves in time and space, how it is affected by real time congestion data, how queues are created, how they evolve and dissipate in space and time, etc.) and differs substantially from the mere interpolation of field measures through artificial intelligence methods. Conventional monitoring systems typically apply data mining techniques to match the current time-series with historical patterns, thus providing forecasts on local and typical conditions. However, the statistical inference alone may not allow to deduce the traffic state of unmonitored links from the observed traffic data or to forecast the consequences of unpredictable atypical events such as road accidents. The forecast engine of the state prediction module 130 can be specifically conceived for metropolitan contexts, where the congestion is strongest, while the day-to-day variability and the within-day fluctuation of vehicle flows and travel times is not negligible. However, it can also be installed in extra-urban frameworks (e.g., for rural areas) that are less complex by their nature.

The underlying mathematical model is based on an explicit representation of traffic phenomena, with particular reference to flow and congestion propagation. For example, the GLTM (Gentile G. (2008) The General Link Transmission Model for dynamic network loading and a comparison with the DUE algorithm. Proceedings of the Second International Symposium on Dynamic Traffic Assignment—DTA 2008, Leuven, Belgium), which is a macroscopic dynamic network loading model based on the Simplified Kinematic Wave Theory, may be used as forecast engine. Key features of the GLTM are: the possibility to adopt a fundamental diagram with general shape; complete representation of general intersections, even signalized; no need for spatial discretization of links (contrary, for example, to the Cell Transmission Model). Thus, the proposed modeling approach is different from conventional approaches where individual vehicles are treated as separate elements. Therefore, the GLTM is computationally more efficient than conventional solutions which in turn allows forecast computations of larger or more detailed networks in near-real-time with sufficient accuracy.

In order to obtain a continuous update of the traffic forecast, the GLTM may be sequentially applied with a rolling horizon schema, exploiting both the Transport Model and the traffic data (measures and events) gathered from the monitored links. A person skilled in the art will understand the Transport Model as the conjunction of the assignment graph and the demand model. Demand models are well known in the field of traffic forecasting.

Specifically, a continuously updated traffic flow forecast can be achieved by performing a sequence of near-real-time dynamic traffic propagations over the network with rolling horizon. In order to correctly implement the rolling horizon context, each forecast computation adopts as initial conditions the traffic state calculated by the previous forecast computation in correspondence to its initial state (that is, it does not start from empty network initial conditions). As a consequence, the congestion situation can be "transmitted" from one forecast computation to the next one, making sure that previously calculated queues and/or measure-derived variations are inherited.

Traffic measures and events collected continuously from the field (i.e., the real-world traffic situation), can be used to correct in near-real-time the propagation of the demand flows produced by GLTM on the network.

In more detail, on each monitored link and time interval an additional flow can be introduced (in algebraic sense) equal to the difference between the observed flow value and the flow value calculated by the network loading model for the same time interval, which gets eventually propagated through the network. Moreover, if the measured flow is recognized to be critical because it indicates that the effect of an active downstream capacity constraint has reached (e.g., in the form of a vehicle queue) the monitored link, then the capacity of the link can be set equal to the measured flow.

While the forecast computation is running, the above corrections propagate through the network, in coherence with traffic flow theory implemented within GLTM, from the road section where they were generated both upstream (as queues) and downstream (as flow variations). The evolution of link flows over time results from three contributions:

- one contribution produced from the demand loaded on the network;
- one contribution obtained by the downstream propagation of additional flows generated on all monitored links;
- one contribution produced by the upstream propagation of queues generated by capacity constraints imposed in correspondence of hypercritical observed flows.

In one embodiment, the state prediction module 130 can group the time dependent traffic parameters by predefined day types. A particular day type classifies a particular average traffic behavior of the traffic system during the day. Grouping by day type includes averaging the time dependent parameters over a plurality of days having the same day type. For example, the traffic behavior during weekends or holidays may deviate significantly from the traffic behavior during working days. Whereas during a working day during the rush hours critical bottlenecks in the assignment graph 120 may face low speed values due to congestion, during weekends or holidays the speed profiles during the same hours of the day may include speed values close to the allowed speed limits. Using day type specific time dependent parameters can improve the accuracy of the traffic state prediction for days of respective day types.

In one embodiment, the computer system 100 further supports zoning. In this embodiment, the interface module 110 can receive a plurality of zone definitions ZD 280 (e.g., from the operator 10 or from another computer system, such as the traffic control module 290). Each zone covers a portion of the assignment graph 120 so that the starting point of each measured trajectory is assigned to a respective origin zone and the end point of each measured trajectory is assigned to a respective destination zone. The state prediction module 130 can then determine time dependent generation shares 135 based on the time-stamped location data of the mapped trajectories (links). A particular generation share is the time dependent ratio between the number of trajectories starting in a particular zone and entering the assignment graph 120 on a particular link of the assignment graph, and the total number of trajectories starting in the particular zone. In this embodiment, time dependent generation shares become part of the time dependent traffic parameters used to determine the traffic state forecast FC1.

Figure 5A:
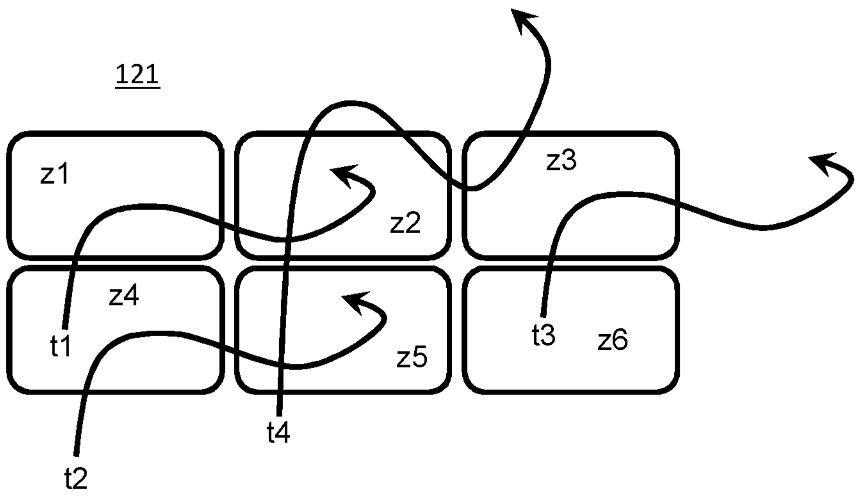
FIGS. 5A, 5B illustrated zoning examples according to embodiments of the invention.

FIG. 5A illustrates an assignment graph 121 with multiple zones z1 to z6. Zones can be fully or partially associated with trajectories. In the example, the trajectories t1 to t4 of four traffic participants are shown. Trajectory t1 starts in z4, passes through z1 and ends in z2. That is, t1 exists entirely within the assignment graph 121. However, when looking at the trajectories t2 to t4, the situation is different. Trajectory t2 starts outside the assignment graph 121 and enters the graph z4 passing to z5 where it ends. Trajectory t3 starts within the assignment graph in z6 and passes z3 to finally leave the assignment graph. Trajectory t4 starts outside the assignment graph and enters in z5 to pass z2 and (temporarily) leave the assignment graph 121. Then, t4 re-enters z2 and passes to z3 to finally leave the assignment graph. An origin zone is defined as a zone where a trajectory starts and the corresponding destination zone is defined as the zone where the trajectory ends. That is, the origin zone is the first zone intercepted by the trajectory and the destination zone is the last zone intercepted by the trajectory. In other words, the origin zone is the zone that the trajectory touches first, and the destination zone is the zone that the trajectory touches last.

As discussed earlier, flows are admitted to disappear from the assignment graph which can be measured through the attraction shares. Each link may potentially have one or more attraction shares towards the zones where the trajectories exiting that link end. When a trajectory eventually leaves the assignment graph at the end of the trip, a connector can be created from the respective link ending in the centroid of the zone where the trajectory will stop.

Similarly, flows can be created (i.e. flows entering the assignment graph 121 from outside or a trajectory starting in a zone of the assignment graph). From the received location data 270 it is known on which links the trajectories t1 to t4 start. Therefore, for all links with at least one starting trajectory a corresponding numerical value—the so-called generation share—can be assigned. A particular generation share is computed as the ratio between the total number of trajectories starting on a particular link and the total number of trajectories of the data set:

$$GS(l) = \frac{|t(l)|}{T}$$

where l is a link, |t(l)| is the cardinality of the set t(l) representing all trajectories starting on l, and T is the total number of trajectories of the data set.

If zoning is available, the generation shares can be computed as:

$$GS_o(l) = \frac{|t_o(l)|}{T_o}$$

Where l is a link, $|t_o(l)|$ is the cardinality of the set $t_o(l)$, representing all trajectories starting on l and coming from the zone o, and $T_o$ is the total number of trajectories of the data set starting into the zone o where the demand generated in the link l comes from. Clearly $T=\Sigma_z T_z$.

Assuming that in the example of FIG. 5A actually three cars would drive on the same trajectory as indicated by t1 and two cars would drive on the same trajectory as indicated by t2. Then the generation shares for the respective starting/entry links in z4 are GSt1=3/5 and GSt2=2/5. Each link may potentially have a generation share assigned from the zone where it starts.

Note that the origin zone o could be different from the zone that the link l belongs to. This is mainly because a trajectory can enter the assignment graph far away from its starting point on the entire infrastructure graph.

Figure 5B:
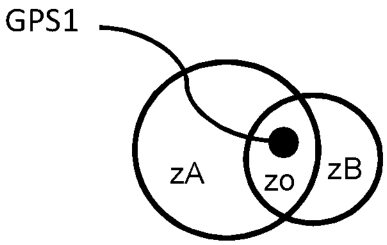

When using zoning and day types, the state prediction module can construct a plurality of sample origin-destination-matrices for a day type period (i.e. a particular time window that relates to a particular day type). A sample origin-destination-matrix (O/D matrix) quantifies the flow of traffic participants between two zones of the assignment graph observed from the FCD data/trajectories during predefined time intervals within the day period. The contribution of a particular trajectory to the O/D matrix is counted for the time point when the particular trajectory starts from or enters a particular origin zone. Consequently, each mapped trajectory is associated with an origin zone and a destination zone if it passes at least one zone of the assignment graph. Thus, the O/D matrix can be reconstructed by aggregating flow data by day-types for respective time points during the day according to the same configuration value used to create the speed profiles, and/or aggregated by vehicle class. That is, there can be different matrices for each vehicle class (as different speed profiles for different vehicle classes) and each matrix can be profiled/aggregated temporally according to a configured time window. For example, all trajectories (of the same vehicle class) starting in a first zone and going to a second zone during the time interval between 12.00 AM and 12.15 AM can be counted and put into the matrix of the corresponding vehicle class for this time interval. The contribution of each trajectory to the O/D matrix is based on the time point which corresponds the first location data set of a respective trajectory, that is, the start or entry time of the mapped trajectory into the origin zone. If zones have overlaps it may happen that a trajectory has more than one origin zone and/or destination zone. In this case, the zone with the minimum area may be chosen. FIG. 5B illustrates a GPS point GPS1 which is located in the overlapping portion (intersection) zo of two the zones zA and zB. In the example, zone zA covers a larger area than zone zB. In this case, GPS1 may be associated which zone zB which covers the smaller area.

A mapped trajectory can have the first and last location data points outside of any zone. In that case, the origin and the destination zones may be selected according to the first and last zones intercepted by the trajectory itself. The total flow volume of the sample O/D matrices is equal to the total number of tracked trajectories for a particular day-type at a given time point during the day. Optionally, grouping/aggregation of flow volumes may also be applied for different vehicle classes similar to the grouping of speed profiles explained earlier. In general, a sample O/D matrix describes a number of trips (trajectories) per day. If the number of trajectories is collected over an observation period including a plurality of days the total number of overserved trajectories is normalized with regards to the plurality of days. That is, it is advantageous to renormalize the observed flow volumes according to the number of days that contributed to the construction of the sample O/D matrices. For example, if a flow data set (a set of time dependent location data) contributing to one sample O/D matrix includes flow data sampled over two days (or longer periods of several weeks or months), at the end the global flow volume is be divided by two (or the number of days in the sampling period). To not underestimate the final daily flow volume the statistical sampling over the different days may be of the same order of magnitude, i.e. the number of trajectories observed during those days should be roughly equal for each day. If this condition is not satisfied, it may be better to renormalize the total flow volume of the O/D matrix by an effective number of days given by a weighted average of each single day where the weight is the ratio between the actual number of trajectories of that day and the maximum number of trajectories observed during all days of the observation period. For the above example, with a data set collected over two days, the data set may include one hundred trajectories for the first day and fifty trajectories for the second day. The overall 0/D matrix volume can then be divided by 1.5 instead of 2 because the second day has a weight equal to half (50/100) the weight of the first day.

Figure 4B:
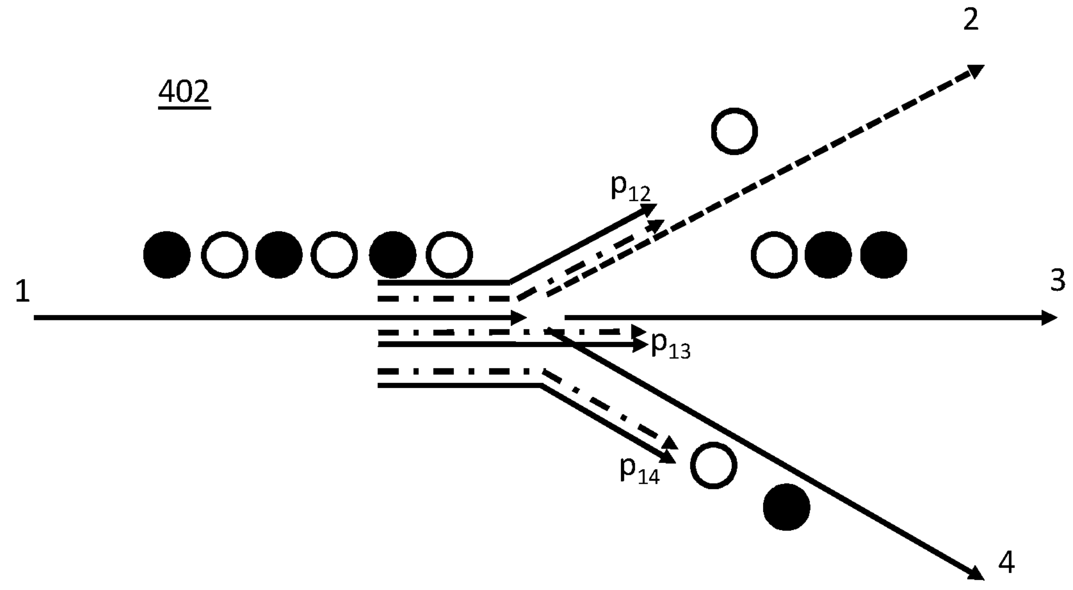

When using zoning, turn probabilities and attraction shares can be determined by destination zone. FIG. 4B illustrates and example for determining destination based turn probabilities including a destination based attraction share. Turn probabilities and attraction shares allow to provide more reliable traffic state forecast results by improving the respective assignment algorithms. FIG. 4B illustrates an example at the same or a similar intersection used in FIG. 4A. Again, at the intersection, the dashed link 2 is leaving the assignment graph but nevertheless there is a mapped real-world trajectory using the turn 1-2. Black bullets represent traffic participants moving to a first destination zone a and circles represent traffic participants moving to a second destination zone b. In the example, destination based turn probabilities with regards to the first destination zone a are determined as: p12_a_=0, p13_a_=2/3, p14_a_=1/3. Destination based turn probabilities with regards to the second destination zone b are determined as p12_b_=1/3, p1_ba_=1/3, p14_b_=1/3, with p12_b_=1/3 being an attraction share.

When using zoning, in one embodiment, a plurality of entry and exit connectors may be generated by the proposed method. An entry connector is a logical link in the assignment graph which directly connects an origin zone (e.g., zone 1) to a corresponding entry link where one or more trajectories enter the assignment graph 121. An exit connector is a logical link in the assignment graph 121 which directly connects an exit link where one or more trajectories exit the assignment graph 121 to the corresponding destination zone (e.g., zone 2 to zone 4). Connectors are logical links through which the demand flows can be injected to and absorbed from the assignment graph. In conventional solutions, connectors are designed manually by transportation engineers. Thereby, the placement of connectors is a difficult and critical issue because it can introduce a big bias in the flow propagation over the assignment graph itself. Typically, transportation engineers try to minimize the number of connectors for each zone simply because it is a heavy time consuming activity. With the herein proposed data driven approach the mapped trajectories inherently have the information about from where trips of traffic participants start (i.e. where the corresponding trajectories enter the assignment graph) and where they end (i.e. where the corresponding trajectories are destroyed). This allows a diffuse loading of the demand flows over the assignment graph which is more realistic than what can be achieved with manually designed logical connectors. In other words, in the proposed data driven approach determining the connectors is implicitly given by the mapped trajectories themselves through the location points where the trajectories are generated and cease to exist. Therefore, the number of connectors generated in the data driven approach is typically much higher than in the manual approach—e.g., proportional to the number of transportation ways of the infrastructure graph—and reflects the concept of diffuse loading of the flows. Further, in standard assignment models the connectors are static objects. In the proposed data driven setting the connectors are dynamic objects. To be able to use them in standard assignment algorithms time varying route choices from and to these connectors are taken into account. Connectors are related to the generation shares and attraction shares.

Connectors are automatically created in a way to be linked to the assignment graph, even if trajectories are defined on the entire infrastructure graph. This is achieved by identifying the first and last link of the assignment graph over which the respective trajectory has passed. For each link where the generation share is different from zero, an entry connector can be created with the corresponding generation share associated to it. The demand can be loaded in proportion to the generation shares. Analogously, for each link where the attraction share by destination is different from zero, an exit connector can be created and the corresponding attraction share by destination is associated with it as a turn probability (e.g., p12_b_=1/3 in FIG. 4B). Turn probabilities by destination allow to propagate coherently the flows from the generation points up to the destination points, so from the connectors where the demand flows are loaded up to the connectors where the demand flows exit from the assignment network. The flow propagation of the O/D matrix is performed accordingly to these local route choices.

The demand can be loaded on each entry connector based on the corresponding generation share accordingly with the following formula:

$$F_{oc} = \frac{D_o GS_{oc}}{\sum_{c' \in C_o} GS_{oc'}}$$

where Do is the total demand flow generated in zone o Foc is the demand flow generated in zone o loaded on the entry connector c GSoc is the generation share associated to connector c Co is the set of exit connectors from zone o Generation shares can be used instead of connectors to directly load demand matrices on the assignment graph, specifically on links where generation shares are different from zero.

$F_{ol}=D_o GS_{ol}$ where Do is the total demand flow generated in zone o Fol is the demand flow generated in zone o loaded as additional entry flow on link l GSol is the generation share associated to link 1 from zone o If zoning is available the generation shares can be computed as:

$$\text{share}_O(l) = \frac{|t_O(l)|}{T_o}$$

where l is a link |to (l)| is the cardinality of the set to (l), representing all trajectories starting on 1 and coming from the zoneo, and To is the total number of trajectories of the data set starting into the zoneo where the demand generated in the link 1 comes from.

Therefore: $T=\Sigma z\ Tz$.

The origin zoneo can be different from the zone to which the link 1 belongs because a trajectory can enter on the assignment graph far away from its starting point on the full infrastructure graph.

FIG. 6A shows a pseudo code example 610 for an example algorithm to identify the origin zone and the destination zone for a particular trajectory. The concept behind is to check where the map-matched trajectory enters for the first time into a zone of the assignment graph and where it exits a zone of the assignment graph for the last time. The respective zones are then identified as the origin and destination zones.

FIG. 6B shows a pseudo code example 620 for an example algorithm to map a trajectory on the infrastructure graph to the assignment graph. This mapping is not simply a correspondence from streets to links. Instead; the algorithm also infers the entry times and the travel times over the links.

FIG. 6C shows a pseudo code example 630 for an example algorithm to update counters needed to compute the output results like generation shares, attraction shares, turning probabilities, sample O/D matrices. The algorithm takes as input a trajectory which contributes to increment all the counters.

FIG. 6D shows a pseudo code example 640 for an example algorithm to compute the turn probabilities once the counters are updated. The algorithm computes the ratio between the turn counters and the corresponding link counter of the first link of the turn. Optionally, this computation can be performed by destination, too. The algorithm also computes the attraction shares.

FIG. 6E shows a pseudo code example 650 for an example algorithm to compute the generation shares once all counters are updated. Generation shares may also be computed by destination.

FIG. 6F shows a pseudo code example 660 for an example algorithm to compute connectors based on generation shares and attraction shares. The algorithm creates links connecting the centroid of a zone with the tail of the generation shares arcs, and with the head of the attraction shares arcs.

Figure 7:
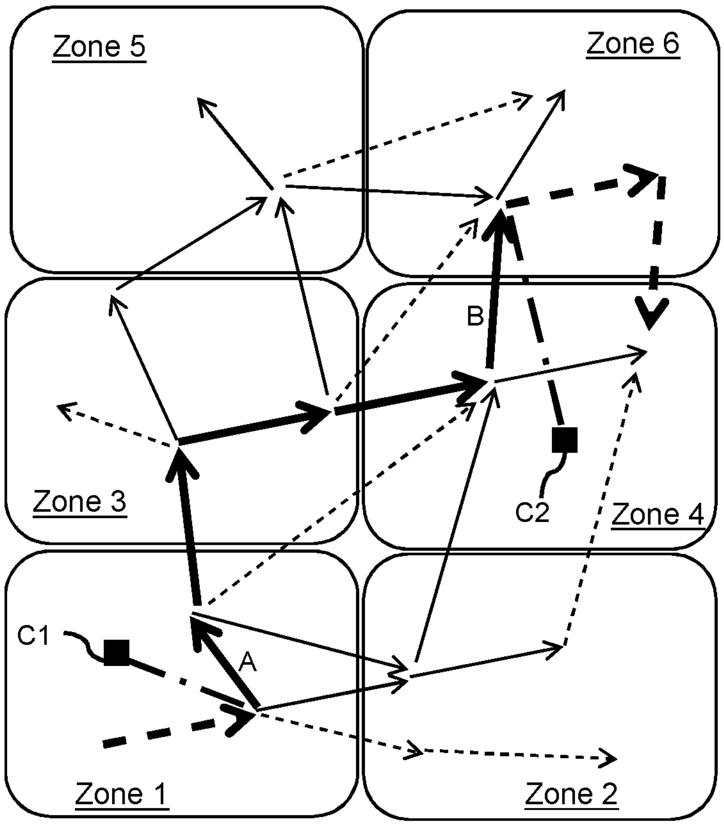
FIG. 7 illustrates a further zoning example according to an embodiment.

FIG. 7 illustrates a further zoning example with zones 1 to 6 and with connectors according to an embodiment. In the example, the dashed links refer to edges of the infrastructure graph that are not part of the assignment graph. The solid line links are part of the assignment graph. The bold links represent a particular map matched trajectory that enters the assignment graph in zone 1 and exits the assignment graph in zone 4. On link A (the first link of the map matched trajectory on the assignment graph) a generation share can be determined. As a consequence, a connector can be generated from the tail of link A to the zone centroid C1 of zone 1 where the map matched trajectory starts. The centroid C1 is represented by a black square and the connector is represented by the dash-dotted line between the entry point of the trajectory on link A and C1. On link B (the last one of the map matched trajectory on the assignment graph) an attraction share is assigned and so from the head of link B (exit point) a connector is generated to the zone centroid C2 of zone 4 (the zone where the trajectory exits the assignment graph). Again, the connector is represented by a dash-dotted line from the end of link B to C2.

Figure 8:
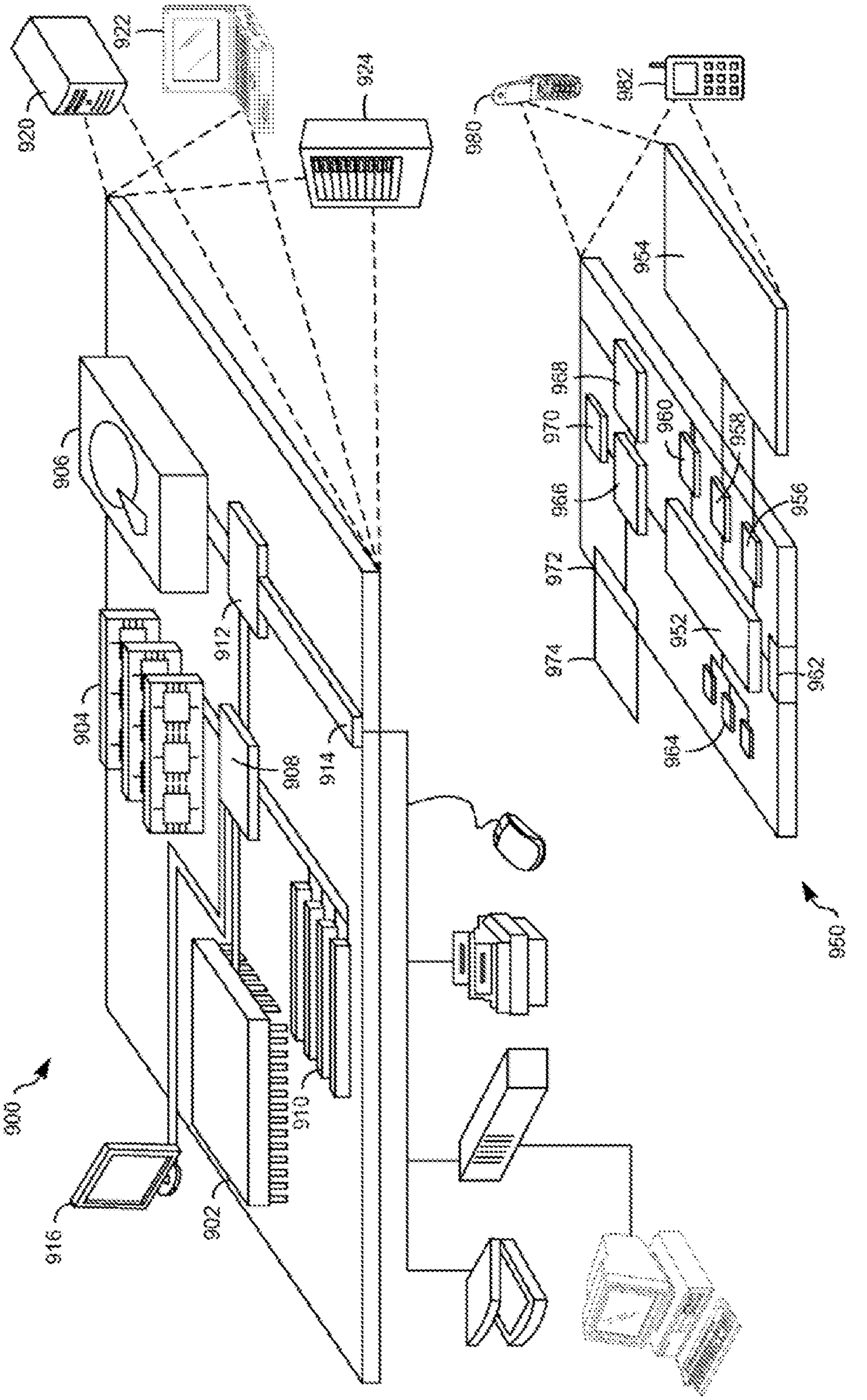
FIG. 8 is a diagram that shows an example of a computer device and a mobile computer device, which may be used with the techniques described here.

FIG. 8 is a diagram that shows an example of a computer device 900 and a mobile computer device 950, which may be used with the techniques described here. Computing device 900 is intended to represent various forms of digital computers, such as laptops, desktops, workstations, personal digital assistants, servers, blade servers, mainframes, and other appropriate computers. Computer device 900 may correspond to the computer system 100 for stay detection of FIG. 1. Computing device 950 is intended to represent various forms of mobile devices, such as personal digital assistants, cellular telephones, smart phones, and other similar computing devices. For example, computing device 950 may include a hand-held front end device used by the user 10 as shown in FIG. 1 to interact with the computer system 900. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may include appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the claimed scope of the claimed subject matter.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer system for predicting a state of a traffic system to control the traffic system, wherein the traffic system includes a traffic infrastructure configured to allow movement of real world traffic participants, the system comprising:

an interface module configured to:

receive time-stamped location data of a plurality of traffic participants measured during a time period, wherein the time-stamped location data represents a plurality of trajectories reflecting movements of the plurality of participants during the time period;

provide the time-stamped location data to at least one map matching module;

receive, from the at least one map matching module, a plurality of links wherein each link represents a real world connection corresponding to a portion of a measured trajectory mapped to a corresponding element of a graph, the graph representing the traffic infrastructure;

receive an assignment graph including a subset of connected elements of the graph wherein the subset is selected based on predefined transportation and traffic criteria;

provide a state forecast (FC1) for the traffic system to an operator to enable the operator to interact with the traffic system in response to the state forecast (FC1); and a state prediction module configured to:

determine, based on the time-stamped location data of the mapped trajectories, time dependent speed profiles for the received links;

determine, based on the time-stamped location data of the mapped trajectories, time dependent turn probabilities from each link to each possible successive link of the assignment graph;

determine, based on the time-stamped location data of the mapped trajectories, time dependent attraction shares corresponding to time dependent turn probabilities from links belonging to the assignment graph toward successive links not belonging to the assignment graph; and determine the state forecast (FC1) for a given future time point based on time dependent traffic parameters including the speed profiles, turn probabilities, and attraction shares, in conjunction with at least one existing time-dependent origin-destination-matrix and a Sequential Dynamic Traffic assignment methodology using a Dynamic User Equilibrium model and a Sequential Dynamic Network Loading model.

2. The system of claim 1, wherein the interface module is further configured to:

receive, from the at least one map matching module, for each link one or more time dependent trajectory specific speed profiles indicating average speed values during respective time intervals wherein each speed value is associated with a respective mapped trajectory; and wherein the state prediction module is further configured to determine the time dependent speed profiles by:

aggregating the trajectory specific speed profiles for each link wherein the aggregate speed values are based on the trajectory specific speed values of all trajectories mapped to the respective link.

3. The system of claim 1, wherein the state prediction module is further configured to:

group the time dependent traffic parameters by predefined day types wherein a particular day type classifies a particular average traffic behavior of the traffic system during the day and grouping includes averaging the time dependent parameters over a plurality of days having a same day type.

4. The system of claim 1, wherein the interface module is further configured to:

receive a plurality of zone definitions wherein each zone covers a portion of the assignment graph so that a starting or entry point of each measured trajectory is assigned to a respective origin zone and an end or exit point of each measured trajectory is assigned to a respective destination zone; and wherein the state prediction module is further configured to:

determine, based on the time-stamped location data of the mapped trajectories, time dependent generation shares, wherein a particular generation share is a time dependent ratio between a number of trajectories starting in a particular zone and entering the assignment graph on a particular link of the assignment graph, and a total number of trajectories starting in the particular zone; and wherein the time dependent traffic parameters to determine the forecast further comprise the time dependent generation shares.

5. The system of claim 4, wherein the state prediction module is further configured to:

construct a plurality of sample origin-destination-matrices for a day type period wherein a sample origin-destination-matrix quantifies a flow of traffic participants between two zones of the assignment graph during predefined time intervals within the day period and a contribution of a particular trajectory to the matrix is counted for the time point when the particular trajectory enters a particular origin zone; and to update the at least one existing time-dependent origin-destination-matrix with the sample origin-destination-matrices.

6. A computer-implemented method for predicting a state of a traffic system to control the traffic system wherein the traffic system includes a traffic infrastructure configured to allow movement of real world traffic participants, the method comprising:

receiving time-stamped location data of a plurality of traffic participants measured during a time period wherein the time-stamped location data represents a plurality of trajectories reflecting the movements of the plurality of participants during the time period;

providing the time-stamped location data to at least one map matching module;

receiving, from the at least one map matching module, a plurality of links wherein each link represents a real world connection corresponding to a portion of a measured trajectory mapped to a corresponding element of a traffic infrastructure graph;

receiving an assignment graph including a subset of connected elements of the traffic infrastructure graph wherein the subset is selected based on predefined transportation and traffic criteria;

determining, based on the time-stamped location data of the mapped trajectories, time dependent speed profiles for the received links;

determining, based on the time-stamped location data of the mapped trajectories, time dependent turn probabilities from each link to each possible successive link of the assignment graph;

determining, based on the time-stamped location data of the mapped trajectories, time dependent attraction shares corresponding to time dependent turn probabilities from links belonging to the assignment graph toward successive links not belonging to the assignment graph; and providing, to an operator of a traffic control system, a forecast of the state of the traffic system for a given future time point based on time dependent traffic parameters including the speed profiles, turn probabilities, and attraction shares, in conjunction with at least one existing time-dependent origin-destination-matrix and a Sequential Dynamic Traffic assignment methodology using a Dynamic User Equilibrium model and a Sequential Dynamic Network Loading model.

7. The method of claim 6, further comprising:

storing time dependent traffic parameters including the speed profiles, turn probabilities, and attraction shares as part of the state prediction model to be used in conjunction with at least one existing time-dependent origin-destination-matrix and the Sequential Dynamic Traffic assignment methodology using the Dynamic User Equilibrium model and the Sequential Dynamic Network Loading model.

8. The method of claim 6, wherein determining time dependent speed profiles further comprises:

receiving, from the at least one map matching module, for each link one or more time dependent trajectory specific speed profiles indicating average speed values during respective time intervals wherein each speed value is associated with a respective mapped trajectory; and aggregating the trajectory specific speed profiles for each link wherein the aggregate speed values are based on the trajectory specific speed values of all trajectories mapped to the respective link.

9. The method of claim 8, further comprising:

grouping the time dependent traffic parameters by predefined day types wherein a particular day type classifies a particular average traffic behavior of the traffic system during the day and grouping includes averaging the time dependent parameters over a plurality of days having a same day type.

10. The method of claim 6, further comprising:

receiving a plurality of zone definitions wherein each zone covers a portion of the assignment graph so that a starting point of each measured trajectory is assigned to a respective origin zone and a end point of each measured trajectory is assigned to a respective destination zone;

determining, based on the time-stamped location data of the mapped trajectories, time dependent generation shares, wherein the generation share for a particular link with regards to a particular origin-destination zone pair, is determined as a ratio of a number of trajectories starting in a particular origin zone, ending in a particular destination zone, and entering the assignment graph on a given link of the assignment graph, and a total number of trajectories passing between the particular origin-destination zone pair; and wherein the time dependent traffic parameters for providing the forecast further include the time dependent generation shares.

11. The method of claim 10, further comprising:

constructing a plurality of sample origin-destination-matrices for a day type period wherein a sample origin-destination-matrix quantifies a flow of traffic participants between two zones of the assignment graph during predefined time intervals within the day period and contributions of a particular trajectory to the matrix is counted for the time point when the particular trajectory enters a particular origin zone; and updating the at least one existing time-dependent origin-destination-matrix with the sample origin-destination-matrices.

12. The method of claim 11, further comprising:

generating a plurality of entry and exit connectors wherein an entry connector is a logical link in the assignment graph which directly connects an origin zone to a corresponding entry link where one or more trajectories enter the assignment graph, and an exit connector is a logical link in the assignment graph which directly connects an exit link where one or more trajectories exit the assignment graph to a corresponding destination zone.

13. The method of claim 10, wherein determining time dependent turn probabilities includes determining time dependent turn probabilities by destination zone.

14. The method of claim 10, further comprising:

generating a plurality of explicit time dependent origin and destination path probabilities, wherein an explicit time dependent origin and destination path probability is defined as the probability that a given sequence of consecutive links of the assignment graph is used by all mapped trajectories starting in a given origin zone and ending in a given destination zone.

15. A non-transitory computer program product having instructions that when loaded into a memory of a computing device and executed by at least one processor to predict a state of a traffic system to control the traffic system wherein the traffic system includes a traffic infrastructure configured to allow movement of real world traffic participants, the instructions comprising:

receiving time-stamped location data of a plurality of traffic participants measured during a time period wherein the time-stamped location data represents a plurality of trajectories reflecting the movements of the plurality of participants during the time period;

providing the time-stamped location data to at least one map matching module;

receiving, from the at least one map matching module, a plurality of links wherein each link represents a real world connection corresponding to a portion of a measured trajectory mapped to a corresponding element of a traffic infrastructure graph;

receiving an assignment graph including a subset of connected elements of the traffic infrastructure graph wherein the subset is selected based on predefined transportation and traffic criteria;

determining, based on the time-stamped location data of the mapped trajectories, time dependent speed profiles for the received links;

determining, based on the time-stamped location data of the mapped trajectories, time dependent turn probabilities from each link to each possible successive link of the assignment graph;

determining, based on the time-stamped location data of the mapped trajectories, time dependent attraction shares corresponding to time dependent turn probabilities from links belonging to the assignment graph toward successive links not belonging to the assignment graph;

providing, to an operator of a traffic control system, a forecast of the state of the traffic system for a given future time point based on time dependent traffic parameters including the speed profiles, turn probabilities, and attraction shares, in conjunction with at least one existing time-dependent origin-destination-matrix and a Sequential Dynamic Traffic assignment methodology using a Dynamic User Equilibrium model and a Sequential Dynamic Network Loading model.

16. The non-transitory computer program product of claim 15, wherein determining time dependent speed profiles further comprises:

receiving, from the at least one map matching module, for each link one or more time dependent trajectory specific speed profiles indicating average speed values during respective time intervals wherein each speed value is associated with a respective mapped trajectory; and aggregating the trajectory specific speed profiles for each link wherein the aggregate speed values are based on the trajectory specific speed values of all trajectories mapped to the respective link.

17. The non-transitory computer program product of claim 15, further comprising:

receiving a plurality of zone definitions wherein each zone covers a portion of the assignment graph so that a starting point of each measured trajectory is assigned to a respective origin zone and an end point of each measured trajectory is assigned to a respective destination zone;

determining, based on the time-stamped location data of the mapped trajectories, time dependent generation shares, wherein the generation share for a particular link with regards to a particular origin-destination zone pair, is determined as a ratio of a number of trajectories starting in a particular origin zone, ending in a particular destination zone, and entering the assignment graph on a given link of the assignment graph, and a total number of trajectories passing between the particular origin-destination zone pair, wherein the time dependent traffic parameters for providing the forecast further include the time dependent generation shares.

18. The non-transitory computer program product of claim 15, wherein determining time dependent turn probabilities includes determining time dependent turn probabilities by destination zone.

19. The non-transitory computer program product of claim 15, further comprising:

generating a plurality of explicit time dependent origin and destination path probabilities, wherein an explicit time dependent origin and destination path probability is defined as the probability that a given sequence of consecutive links of the assignment graph is used by all mapped trajectories starting in a given origin zone and ending in a given destination zone.

20. The non-transitory computer program product of claim 15, further comprising:

generating a plurality of entry and exit connectors wherein an entry connector is a logical link in the assignment graph which directly connects an origin zone to a corresponding entry link where one or more trajectories enter the assignment graph, and an exit connector is a logical link in the assignment graph which directly connects an exit link where one or more trajectories exit the assignment graph to a corresponding destination zone.

* * * * *